(12) United States Patent
Nakanishi et al.

(10) Patent No.: US 9,333,915 B2
(45) Date of Patent: May 10, 2016

(54) WORK VEHICLE PERIPHERY MONITORING SYSTEM AND WORK VEHICLE

(71) Applicant: Komatsu Ltd., Tokyo (JP)

(72) Inventors: Yukihiro Nakanishi, Hiratsuka (JP); Takeshi Kurihara, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/992,854

(22) PCT Filed: Nov. 30, 2012

(86) PCT No.: PCT/JP2012/081204
§ 371 (c)(1),
(2) Date: Jun. 10, 2013

(87) PCT Pub. No.: WO2014/045466
PCT Pub. Date: Mar. 27, 2014

(65) Prior Publication Data
US 2015/0183370 A1 Jul. 2, 2015

(30) Foreign Application Priority Data

Sep. 20, 2012 (JP) ................................. 2012-207563

(51) Int. Cl.
*H04N 7/18* (2006.01)
*B60R 1/00* (2006.01)
(Continued)

(52) U.S. Cl.
CPC ... *B60R 1/00* (2013.01); *E02F 9/24* (2013.01); *E02F 9/261* (2013.01); *G08G 1/166* (2013.01);
(Continued)

(58) Field of Classification Search
CPC .... B60R 1/00; B60R 2300/105; B60R 11/04;
B60R 2300/802; B60R 2300/301; B60R 2300/303; B60R 2300/607; B60R 2300/70; H04N 7/181; E02F 9/24; E02F 9/261; G08G 1/166; G06K 9/00778; G06K 9/00785; G06K 9/00791; G06K 9/00798; G06K 9/00805; G06K 9/00812; G06K 9/00818; G06K 9/00825; G06K 9/00832; G06K 9/00845; G06K 9/325; G06K 2209/15; G06T 2207/30248; G06T 2207/302
USPC ......................................................... 348/148
See application file for complete search history.

(56) References Cited

U.S. PATENT DOCUMENTS 5,670,935 A * 9/1997 Schofield et al. ............. 340/461
6,772,057 B2 * 8/2004 Breed et al. .................... 701/45
(Continued)

FOREIGN PATENT DOCUMENTS

JP 2000-344465 A 12/2000
JP 2004-161215 A 6/2004
(Continued)

OTHER PUBLICATIONS

International Search Report dated Feb. 26, 2013, issued for PCT/JP2012/081204.

*Primary Examiner* — Shan Elahi
(74) *Attorney, Agent, or Firm* — Locke Lord LLP

(57) ABSTRACT

A controller includes: a bird's eye image synthesizer generating bird's eye image information for displaying a bird's eye image of a work vehicle and a periphery of the work vehicle; a display controller displaying a first image in which a mark representing an object detected by radar devices overlaps the bird's eye image and a second image captured on the same screen of a monitor; an alarm notifying unit notifying, as the alarm, at least one of a first alarm of displaying a region with the mark differently from a region without the mark in the first image and a second alarm of notifying the existence of the object by a sound; and an alarm releasing unit releasing the alarm in accordance with a releasing order based on a position in which the object exists.

16 Claims, 18 Drawing Sheets

(51) Int. Cl.
*E02F 9/24* (2006.01)
*G08G 1/16* (2006.01)
*E02F 9/26* (2006.01)

(52) U.S. Cl.
CPC ..... *B60R 2300/105* (2013.01); *B60R 2300/301* (2013.01); *B60R 2300/303* (2013.01); *B60R 2300/607* (2013.01); *B60R 2300/70* (2013.01)

(56) References Cited

U.S. PATENT DOCUMENTS

| | | | |
|---|---|---|---|
| 7,742,853 B2* | 6/2010 | Mori et al. | 701/24 |
| 8,467,943 B2* | 6/2013 | Dersjo et al. | 701/50 |
| 8,714,440 B2* | 5/2014 | Flood et al. | 235/375 |
| 2004/0119823 A1* | 6/2004 | Takagi et al. | 348/148 |
| 2006/0044146 A1* | 3/2006 | Ferguson et al. | 340/679 |
| 2006/0092043 A1* | 5/2006 | Lagassey | 340/907 |
| 2007/0233326 A1* | 10/2007 | Jayachandran | 701/1 |
| 2008/0043113 A1* | 2/2008 | Ishii | 348/218.1 |
| 2008/0055568 A1* | 3/2008 | Kondo et al. | 353/94 |
| 2008/0170122 A1* | 7/2008 | Hongo et al. | 348/148 |
| 2008/0181488 A1* | 7/2008 | Ishii et al. | 382/154 |
| 2009/0073263 A1* | 3/2009 | Harada et al. | 348/148 |
| 2009/0092334 A1* | 4/2009 | Shulman et al. | 382/284 |
| 2009/0322878 A1* | 12/2009 | Ishii | 348/148 |
| 2010/0131122 A1* | 5/2010 | Dersj et al. | 701/2 |
| 2010/0184005 A1* | 7/2010 | Eklund et al. | 434/29 |
| 2011/0106380 A1* | 5/2011 | Wang et al. | 701/36 |
| 2013/0009789 A1 | 1/2013 | Ichikawa | |
| 2013/0010118 A1* | 1/2013 | Miyoshi et al. | 348/148 |
| 2013/0088593 A1 | 4/2013 | Ishimoto | |
| 2013/0141581 A1* | 6/2013 | Mitsuta et al. | 348/148 |
| 2013/0147958 A1* | 6/2013 | Mitsuta et al. | 348/148 |
| 2013/0155240 A1* | 6/2013 | Mitsuta et al. | 348/148 |
| 2013/0155241 A1* | 6/2013 | Tanuki et al. | 348/148 |
| 2013/0162830 A1* | 6/2013 | Mitsuta et al. | 348/148 |
| 2013/0182066 A1 | 7/2013 | Ishimoto | |

FOREIGN PATENT DOCUMENTS

| | | |
|---|---|---|
| JP | 2007-235529 A | 9/2007 |
| JP | 2008-254710 A | 10/2008 |
| JP | 2010-198519 A | 9/2010 |
| WO | WO-2006/106685 A1 | 10/2006 |
| WO | WO-2011/114638 A1 | 9/2011 |
| WO | WO-2011/118260 A1 | 9/2011 |
| WO | WO-2011/158955 A1 | 12/2011 |
| WO | WO-2012/043522 A1 | 4/2012 |
| WO | WO-2012/053105 A1 | 4/2012 |

* cited by examiner

| ALARM SOUND LEVEL | SOUND GENERATION TIME ta | SOUND GENERATION STOP TIME tb |
|---|---|---|
| HIGH (H) | tah | tbh |
| MIDDLE (M) | tam (>tah) | tbm (>tbh) |
| LOW (L) | tal (>tam) | tbl (>tbm) |

| RUNNING MODE | RELEASING ORDER (PRIORITY) | | | | | |
|---|---|---|---|---|---|---|
| | 1 | 2 | 3 | 4 | 5 | 6 |
| FORWARD (F) | FRONT (C11) HIGH (H) | RIGHT FRONT (C12) HIGH (H) | LEFT FRONT (C13) HIGH (H) | RIGHT REAR (C14) MIDDLE (M) | LEFT REAR (C15) MIDDLE (M) | REAR (C16) MIDDLE (M) |
| NEUTRAL (N) | FRONT (C11) MIDDLE (M) | REAR (C16) MIDDLE (M) | RIGHT FRONT (C12) LOW (L) | RIGHT REAR (C14) LOW (L) | LEFT FRONT (C13) LOW (L) | LEFT REAR (C15) LOW (L) |
| STOP (P) | FRONT (C11) NONE (NA) | REAR (C16) NONE (NA) | RIGHT FRONT (C12) NONE (NA) | RIGHT REAR (C14) NONE (NA) | LEFT FRONT (C13) NONE (NA) | LEFT REAR (C15) NONE (NA) |
| REVERSE (R) | REAR (C16) HIGH (H) | RIGHT REAR (C14) HIGH (H) | LEFT REAR (C15) HIGH (H) | RIGHT FRONT (C12) MIDDLE (M) | LEFT FRONT (C13) MIDDLE (M) | FRONT (C11) MIDDLE (M) |

| RUNNING MODE | ALARM SOUND LEVEL | | | | | |
|---|---|---|---|---|---|---|
| | C11 | C12 | C13 | C14 | C15 | C16 |
| FORWARD (F) | HIGH (H) | HIGH (H) | HIGH (H) | MIDDLE (M) | MIDDLE (M) | MIDDLE (M) |
| NEUTRAL (N) | MIDDLE (M) | LOW (L) | LOW (L) | LOW (L) | LOW (L) | MIDDLE (M) |
| STOP (P) | NONE (NA) | NONE (NA) | NONE (NA) | NONE (NA) | NONE (NA) | NONE (NA) |
| REVERSE (R) | MIDDLE (M) | MIDDLE (M) | MIDDLE (M) | HIGH (H) | HIGH (H) | HIGH (H) |

…

WORK VEHICLE PERIPHERY MONITORING SYSTEM AND WORK VEHICLE

FIELD

The present invention relates to a technology of monitoring a periphery of a work vehicle.

BACKGROUND

In a civil engineering construction site or a quarry site of a mine, various work vehicles such as a dump truck and an excavator are operated. Particularly in a mine, a superjumbo work vehicle is used. Since such a work vehicle has a vehicle width, a vehicle height, and a longitudinal length which are noticeably larger than those of a general vehicle, it is difficult for an operator to check and recognize a peripheral environment by a side mirror and the like. There is proposed a device which monitors a periphery of a vehicle as a technique of assisting a driving operation by helping an operator to simply recognize a peripheral environment of a vehicle. For example, a device is disclosed which suggests a risk degree of an obstacle within an operation position range of a working unit (Patent Literature 1).

CITATION LIST

Patent Literature
Patent Literature 1: Japanese Patent Application Laid-open No. 2010-198519

SUMMARY

Technical Problem

In the technique of Patent Literature 1, all subjects are displayed on a monitor when a plurality of subjects exist around the work vehicle. As illustrated in Patent Literature 1, since the operation range is present in all directions as in the case of the work vehicle such as an excavator, the plurality of subjects need to be displayed on the monitor. However, if only the plurality of subjects are displayed on the monitor, there is a possibility that an operator (a service man when the work vehicle is examined or repaired) may not sufficiently recognize the subject existing around the work vehicle, for example, when there are other subjects to be monitored.

It is an object of the invention to help an operator of a work vehicle to further reliably recognize a subject existing around the work vehicle when assisting a driving operation by a bird's eye image obtained by synthesizing images captured by a plurality of image capturing devices.

Solution to Problem

According to the present invention, a work vehicle periphery monitoring system comprises: a plurality of image capturing devices each of which is attached to a work vehicle and captures a periphery of the work vehicle to output an image information item; a plurality of object detecting devices each of which is attached to the work vehicle to detect an object existing around the work vehicle; a bird's eye image synthesizing unit that acquires the plurality of image information items and synthesizes the acquired image information items to generate a bird's eye image information item for displaying a bird's eye image of the work vehicle and the periphery of the work vehicle on a display device; a display control unit that displays a first image in which a mark representing the object detected by the object detecting device overlaps the bird's eye image based on the bird's eye image information item and a second image which is captured by the image capturing device on a same screen of the display device; an alarm notifying unit that notifies, as an alarm, at least one or both of a first alarm of displaying a region with the mark in a manner different from a region without the mark in the first image and a second alarm of notifying an existence of the object by a sound; an alarm releasing instruction unit that receives an input for releasing the alarm; and an alarm releasing unit that releases the alarm in accordance with a releasing order based on a position in which the object exists based on an alarm releasing signal from the alarm releasing instruction unit.

In the present invention, it is preferable that in order to release the alarm, the alarm releasing unit displays the region with the mark in a same manner as the region without the mark in the first image to release the first alarm and changes or stops the sound to release the second alarm.

In the present invention, it is preferable that the alarm notifying unit changes a notification mode of the alarm to correspond to the releasing order.

In the present invention, it is preferable that the display control unit keeps displaying the mark even after the alarm releasing unit releases the alarm.

In the present invention, it is preferable that when the object detecting device detects a movement of the object, the display control unit moves the mark in the bird's eye image in accordance with the movement of the object and the alarm notifying unit notifies at least the first alarm.

In the present invention, it is preferable that when the object detecting device detects a new object, the display control unit displays a mark representing the new object in the first image and the alarm notifying unit notifies at least the first alarm.

In the present invention, it is preferable that before the alarm releasing instruction unit receives an input for releasing the alarm, the display control unit displays, as the second image on the display device, an image corresponding to a position in which the alarm releasing unit first releases the alarm among images captured by the image capturing devices.

In the present invention, it is preferable that after the alarm releasing instruction unit receives an input for releasing the alarm and then the alarm releasing unit releases the alarm, the display control unit displays, as the second image on the display device, an image corresponding to a position in which the alarm is released at a next time.

In the present invention, it is preferable that the alarm releasing unit changes the releasing order in accordance with a state of the work vehicle.

In the present invention, it is preferable that the display control unit displays, on the same screen of the display device, a third image representing at least one of a position as a subject of the alarm and a position in which the second image is displayed on the display device.

In the present invention, it is preferable that the display control unit stops the display of the first image on the display device and displays only the third image and the second image displaying the mark on the same screen of the display device.

In the present invention, it is preferable that when the work vehicle runs backward, the display control unit displays, as the second image on the display device, an image at a rear side of the work vehicle among images captured by the image capturing devices, and wherein when the work vehicle runs forward, the display control unit displays, as the second image on the display device, an image of a position in which a dead angle from a driver seat of the work vehicle is the largest at a front side of the work vehicle among images captured by the image capturing devices.

In the present invention, it is preferable that when at least one of the object is detected, the first alarm and the second alarm are released at a same time based on the alarm releasing signal.

According to the present invention, a work vehicle periphery monitoring system comprises: a plurality of image capturing devices each of which is attached to a work vehicle and captures a periphery of the work vehicle to output an image information item; a plurality of object detecting devices each of which is attached to the work vehicle to detect an object existing around the work vehicle; a bird's eye image synthesizing unit that acquires the plurality of image information items and synthesizes the acquired image information items to generate a bird's eye image information item for displaying a bird's eye image of the work vehicle and the periphery of the work vehicle on a display device; a display control unit that displays a first image in which a mark representing the object detected by the object detecting device overlaps the bird's eye image based on the bird's eye image information item and a second image which is captured by the image capturing device on a same screen of the display device; an alarm notifying unit that notifies an alarm by displaying a region with the mark in a manner different from a region without the mark in the first image and notifying an existence of the object by a sound; an alarm releasing instruction unit that receives an input for releasing the alarm; and an alarm releasing unit that releases the alarm in accordance with a releasing order based on a position in which an object exists based on an alarm releasing signal from the alarm releasing instruction unit, wherein the display control unit displays, on the same screen of the display device, a third image representing at least one of a position as a subject of the alarm and a position in which the second image is displayed on the display device, and even after the alarm releasing unit releases the alarm, the display control unit keeps displaying the mark.

According to the present invention, a work vehicle comprises: the work vehicle periphery monitoring system.

According to the invention, it is possible to help an operator of a work vehicle to further reliably recognize a subject existing around the work vehicle when assisting a driving operation by a bird's eye image obtained by synthesizing images captured by a plurality of image capturing devices.

BRIEF DESCRIPTION OF DRAWINGS

FIG. 12 is a diagram illustrating an example of a data table 40 which illustrates a level of an alarm sound used to notify a second alarm.

FIG. 13 is a diagram illustrating an example of a data table 41 which illustrates a releasing order.

FIG. 14 is a diagram illustrating an example of a data table 42 which illustrates an alarm sound level in each alarm region for each running mode of the dump truck 1.

DESCRIPTION OF EMBODIMENTS

Figure 1:
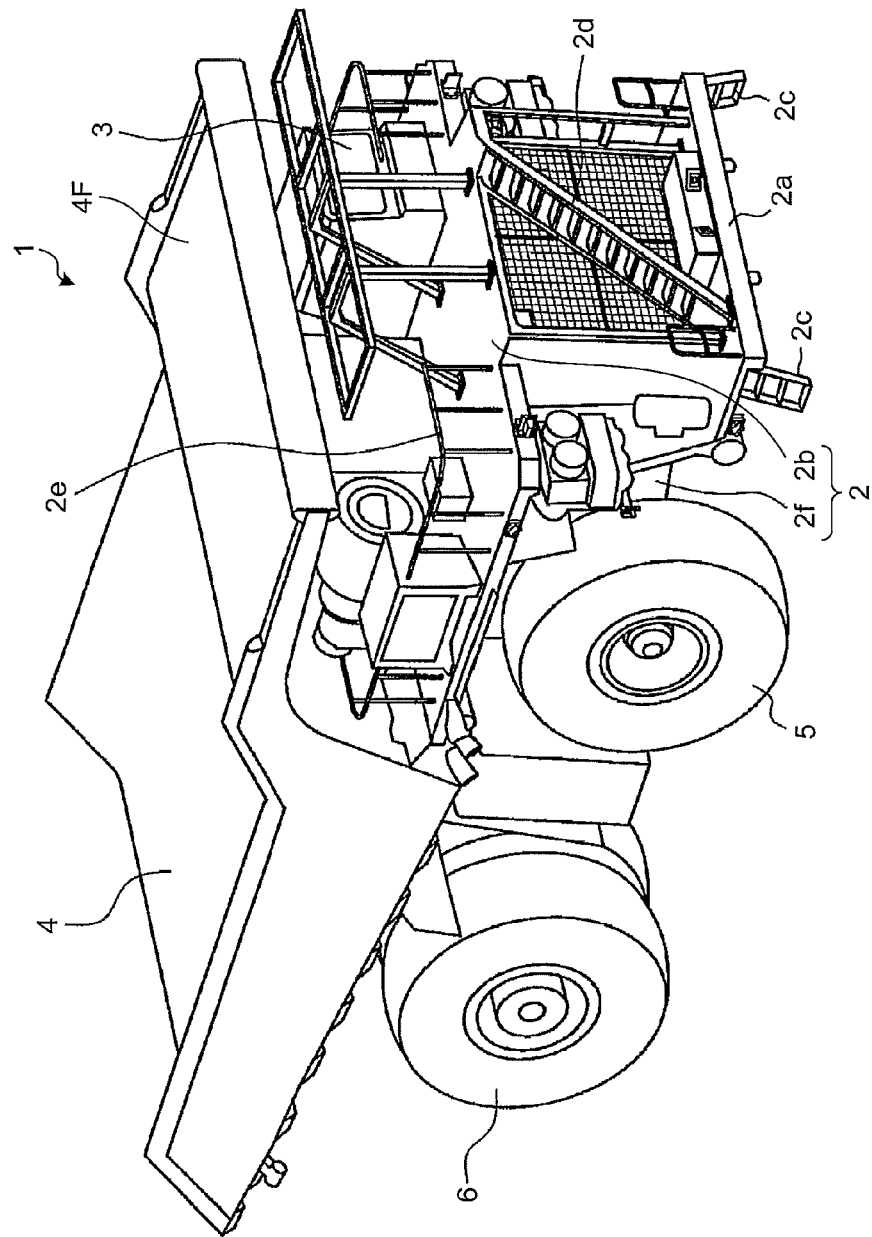
FIG. 1 is a perspective view illustrating a work vehicle according to an embodiment.

A mode for carrying out the invention (embodiment) will be described in detail by referring to the drawings. The invention is not limited to the contents described in the embodiment below. In the description below, the front side, the rear side, the left side, and the right side are terms based on a manipulator as an operator (a service man instead of the operator when a work vehicle is examined or repaired) who sits on a driver seat. For example, the front side indicates the side where the visual line of the operator sitting on the driver seat is directed and the side directed from the driver seat toward a steering operated by the operator. The rear side indicates the opposite side to the front side and the side directed from the steering toward the driver seat. The vehicle width direction of the work vehicle is identical to the left and right direction of the work vehicle.

<Work Vehicle>

Figure 2:
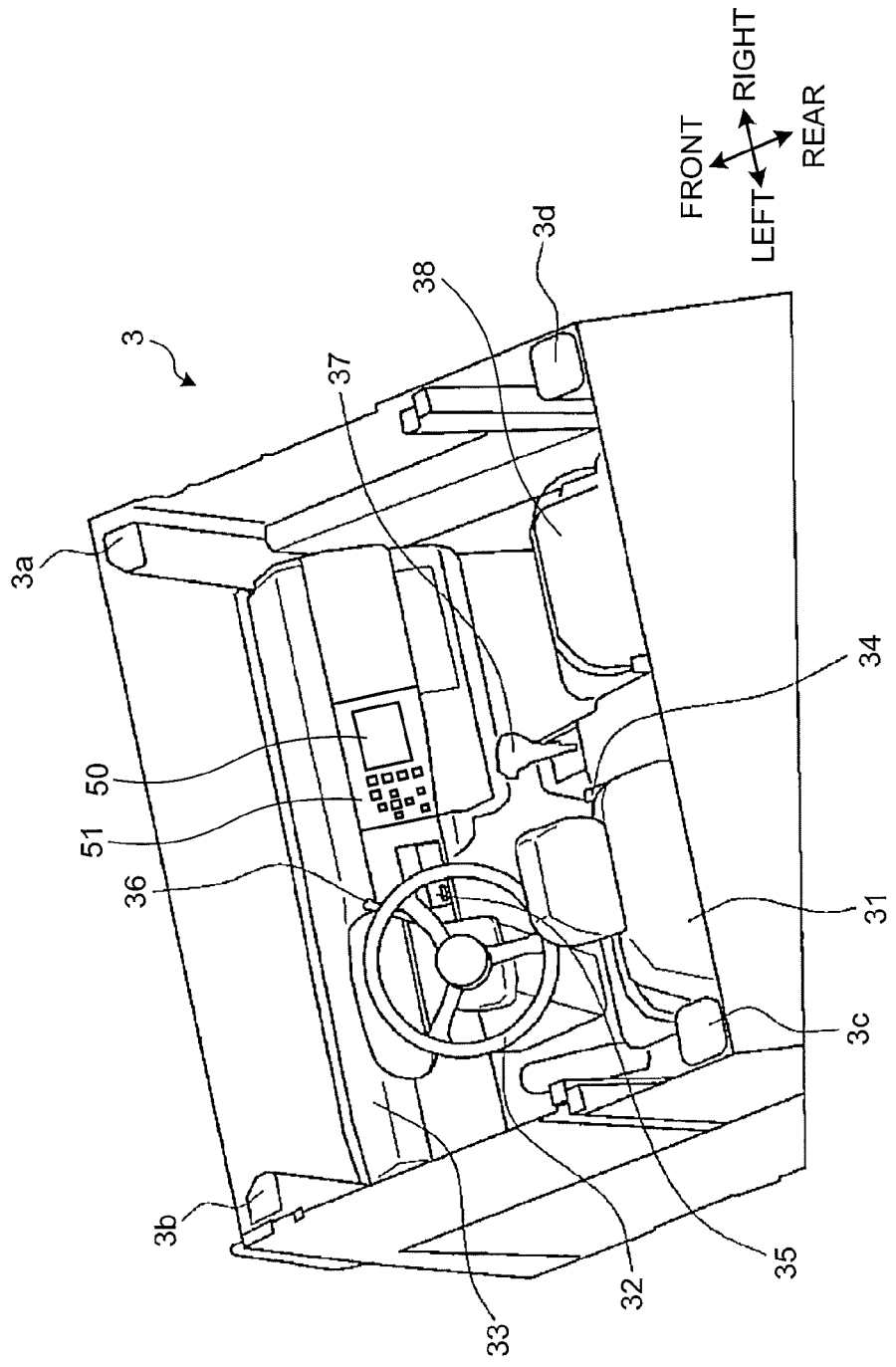
FIG. 2 is a diagram illustrating a structure and an inside of a cab 3 included in the work vehicle according to the embodiment.

FIG. 1 is a perspective view illustrating a work vehicle according to the embodiment. FIG. 2 is a diagram illustrating a structure and an interior of a cab 3 which is included in the work vehicle according to the embodiment. In the embodiment, a dump truck (called an off-highway truck) 1 as the work vehicle is a self-propelled superjumbo vehicle which is used for an operation in a mine. The type of the dump truck is not limited. The dump truck 1 may be of, for example, an articulated type or the like. Further, the work vehicle is not limited to the dump truck 1. The dump truck 1 includes a vehicle body portion 2, the cab 3, a vessel 4, a front wheel 5, and a rear wheel 6. The vehicle body portion 2 includes an upper deck 2b and a frame 2f disposed in the front and rear direction. Further, the dump truck 1 includes a periphery monitoring system which monitors the periphery thereof and displays the result. The periphery monitoring system will be described in detail later.

In the embodiment, the dump truck 1 drives an electric motor by the power generated when an internal combustion engine such as a diesel engine drives a generator, so that the rear wheels 6 are driven. In this way, the dump truck 1 is of a so-called electric driving type, but the driving type of the dump truck 1 is not limited thereto. For example, the dump truck 1 may transmit the power of the internal combustion engine to the rear wheels 6 through a transmission so as to drive the rear wheels or may drive an electric motor by the power supplied through a trolley from a line so as to drive the rear wheels 6 by the motor.

The frame 2f supports power generating mechanisms such as the internal combustion engine and the generator and auxiliary machines thereof. The left and right front wheels 5 (only the right front wheel is illustrated in FIG. 1) are supported by the front portion of the frame 2f. The left and right rear wheels 6 (only the right rear wheel is illustrated in FIG. 1) are supported by the rear portion of the frame 2f. Each of the front wheels 5 and the rear wheels 6 has a diameter of about 2 m (meter) to 4 m (meter). In the rear wheel 6, the position of the vessel 4 at the inside of the vehicle width direction or the vessel 4 at the outside of the vehicle width direction is substantially equal to the position of the rear wheel 6 at the outside of the vehicle width direction. The frame 2f includes a lower deck 2a and the upper deck 2b. In this way, the dump truck 1 which is used in a mine is formed as a double deck structure with the lower deck 2a and the upper deck 2b.

The lower deck 2a is attached to the lower portion of the front surface of the frame 2f. The upper deck 2b is disposed above the lower deck 2a. A movable ladder 2c which is used to elevate, for example, the cab 3 is disposed below the lower deck 2a. An inclined ladder 2d is disposed between the lower deck 2a and the upper deck 2b so that the operator moves therebetween. Further, a radiator is disposed between the lower deck 2a and the upper deck 2b. A palisade guardrail 2e is disposed on the upper deck 2b. In the embodiment, the ladder 2c and the inclined ladder 2d are set as a part of the upper deck 2b and the lower deck 2a.

As illustrated in FIG. 1, the cab (operating room) 3 is disposed on the upper deck 2b. The cab 3 is disposed on the upper deck 2b so as to be shifted to one side in the vehicle width direction in relation to the center in the vehicle width direction. Specifically, the cab 3 is disposed on the upper deck 2b so as to be positioned at the left side in the vehicle width direction in relation to the center. The arrangement of the cab 3 is not limited to the left side in relation to the center in the vehicle width direction. For example, the cab 3 may be disposed at the right side in the vehicle width direction in relation to the center, and may be disposed at the center in the vehicle width direction. Operation members such as a driver seat, a steering wheel, a shift lever, an accelerator pedal, and a brake pedal are arranged inside the cab 3.

As illustrated in FIG. 2, the cab 3 includes a ROPS (Roll-Over Protection System) with a plurality of (in the embodiment, four) pillars 3a, 3b, 3c, and 3d. The ROPS protects the operator inside the cab 3 if the dump truck 1 rolls over. The driver of the dump truck 1 drives the dump truck in a state where a road shoulder at the left side of the vehicle body portion 2 may be easily checked, but the operator's head needs to be largely moved so as to check the periphery of the vehicle body portion 2. Further, the upper deck 2b is provided with a plurality of side mirrors (not illustrated) which check the periphery of the dump truck 1. Since the side mirrors are arranged at positions away from the cab 3, the driver needs to largely move his/her head even when checking the periphery of the vehicle body portion 2 using the side mirrors.

As illustrated in FIG. 2, the cab 3 includes therein a driver seat 31, a steering 32, a dash cover 33, a wireless device 34, a radio receiver 35, a retarder 36, a shift lever 37, a trainer seat 38, a controller (to be described later in detail) as a monitoring control device not illustrated in FIG. 2, a monitor 50, a control panel 51, an accelerator pedal, a brake pedal, and the like. In FIG. 2, the monitor 50 is assembled to the dash cover 33. However, the invention is not limited thereto. For example, the monitor 50 may be provided on the dash cover 33 or may be provided while being hung on the ceiling inside the cab 3. That is, the monitor 50 may be provided at a position in which the operator may see the monitor 50. In the embodiment, the driver seat 31 is provided at the left side of the cab 3, but the position of the driver seat 31 is not limited thereto. Furthermore, a controller which is not illustrated in FIG. 2 is a part of the periphery monitoring system 10 to be described later. The shift lever 37 is a device which allows the operator of the dump truck 1 to change the advancing direction or the gear shifting position of the dump truck 1.

The vessel 4 illustrated in FIG. 1 is a container which loads load such as crushed stones thereon. The rear portion of the bottom surface of the vessel 4 is rotatably connected to the rear portion of the frame 2f through a rotary pin. The vessel 4 may take a loading posture and a standing posture by an actuator such as a hydraulic cylinder. As illustrated in FIG. 1, the loading posture indicates a posture in which the front portion of the vessel 4 is positioned at the upper portion of the cab 3. The standing posture indicates a posture in which the load is discharged and the vessel 4 is inclined rearward and downward. When the front portion of the vessel 4 rotates upward, the vessel 4 changes from the loading posture to the standing posture. The vessel 4 includes a flange portion 4F formed at the front portion thereof. The flange portion 4F is called a protector and extends to the upper side of the cab 3 so as to cover the cab 3. The flange portion 4F which extends to the upper side of the cab 3 protects the cab 3 from the collision with crushed stones and the like.

<Periphery Monitoring System>

Figure 3:
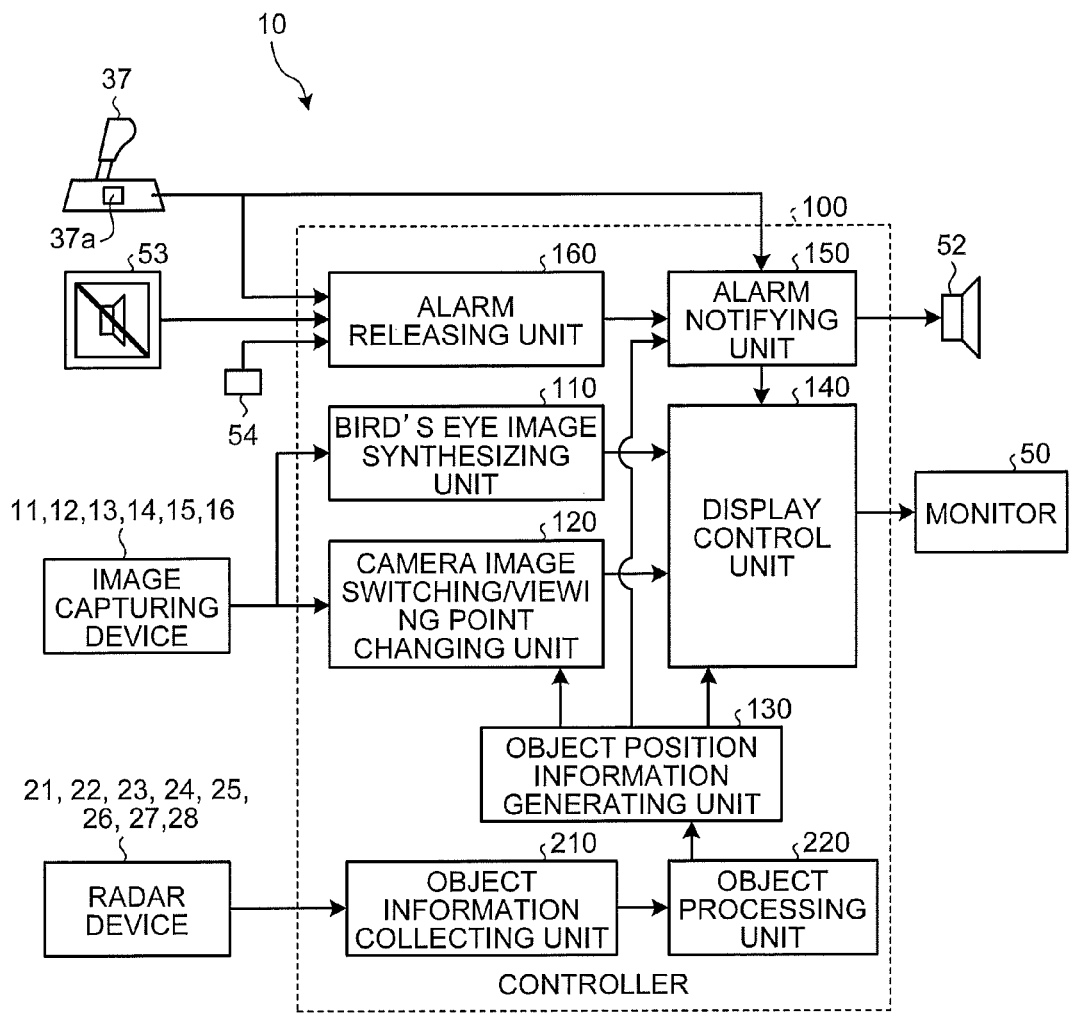
FIG. 3 is a diagram illustrating a periphery monitoring system 10 according to the embodiment.
Figure 4:
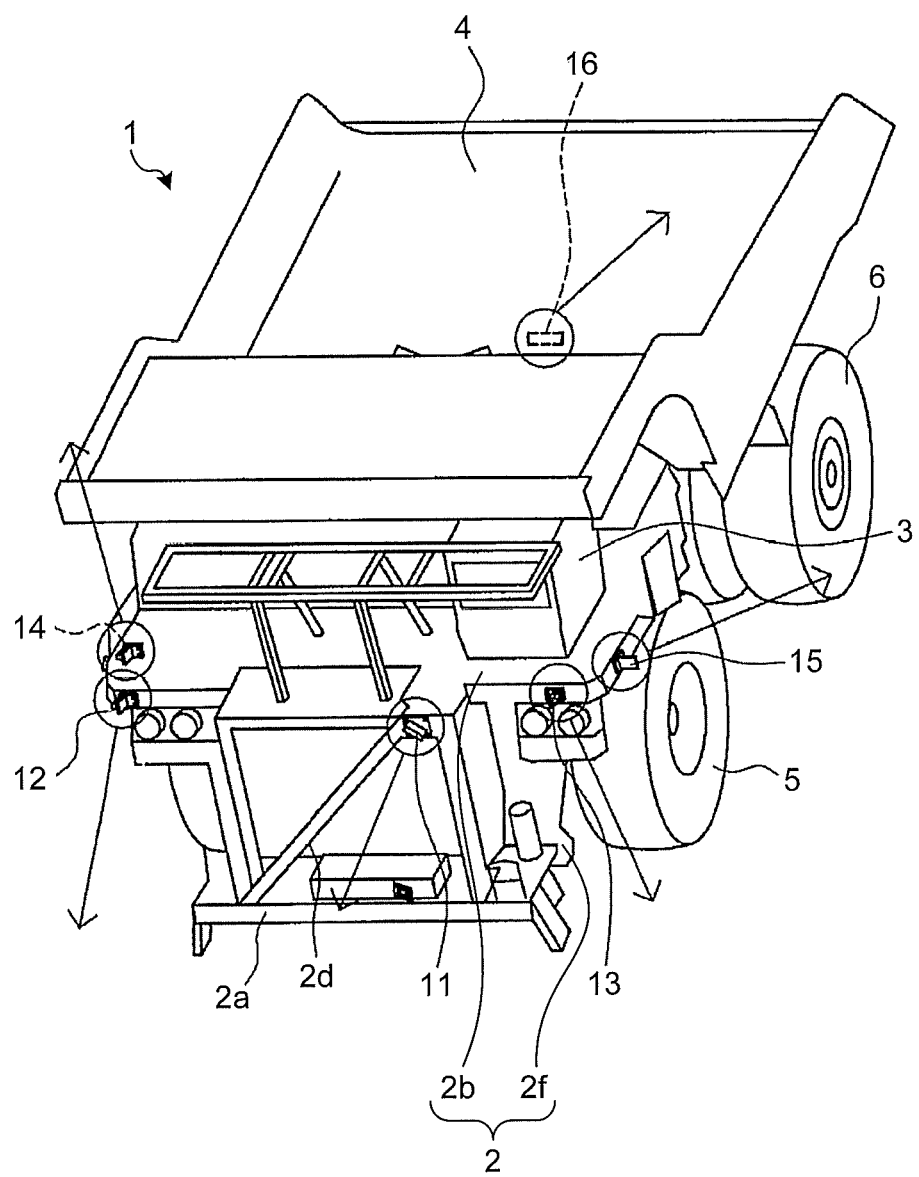
FIG. 4 is a perspective view of a dump truck 1 equipped with image capturing devices 11 to 16 included in the periphery monitoring system 10 according to the embodiment.
Figure 5:
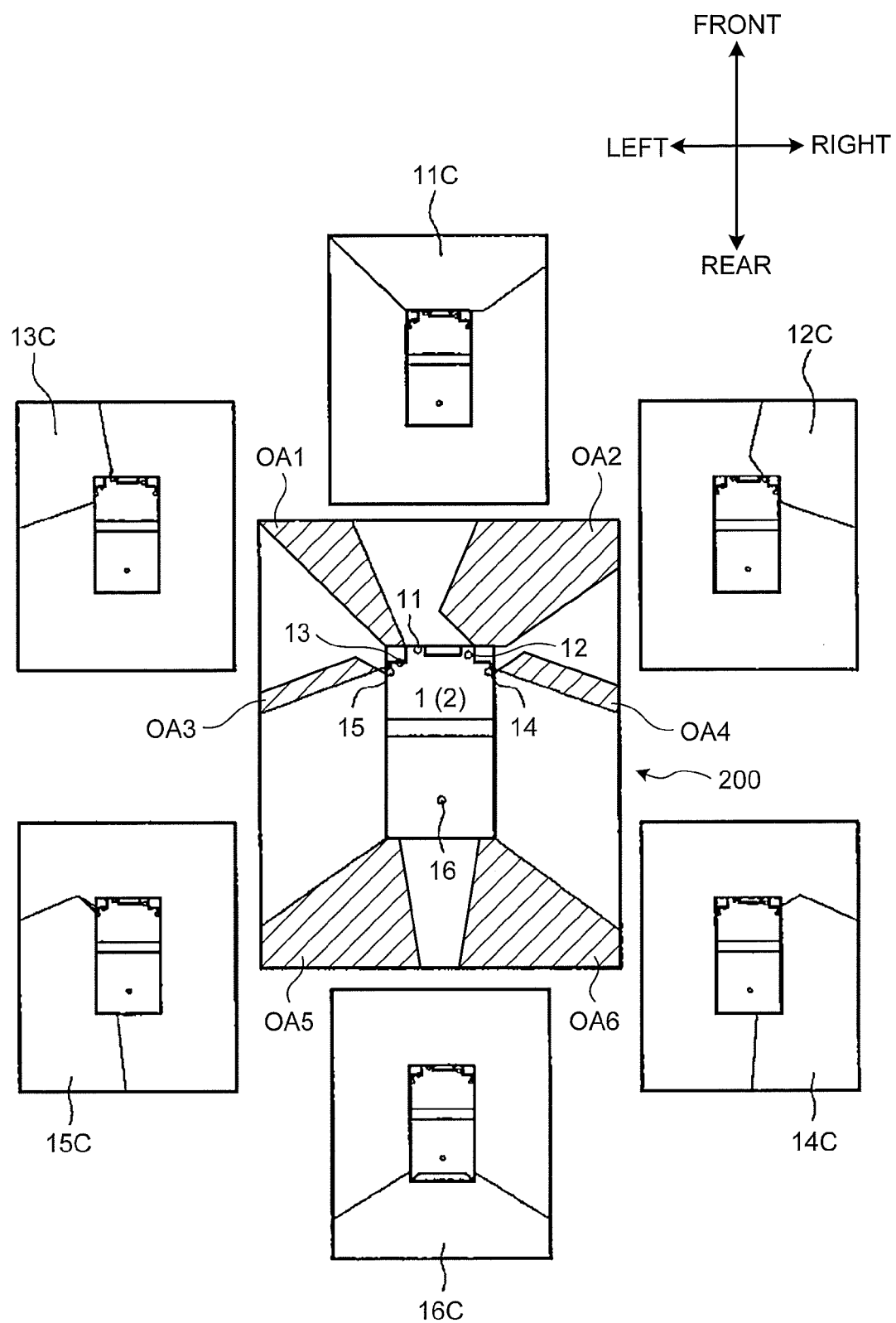
FIG. 5 is a schematic diagram illustrating regions which are captured by a plurality of image capturing devices 11 to 16 and an overhead image 200 which is generated based on information of images captured by the plurality of image capturing devices 11 to 16.

FIG. 3 is a diagram illustrating the periphery monitoring system 10 according to the embodiment. FIG. 4 is a perspective view of the dump truck 1 equipped with image capturing devices 11 to 16 which are included in the periphery monitoring system 10 according to the embodiment. FIG. 5 is a schematic diagram illustrating regions which are captured by a plurality of image capturing devices 11 to 16 and an overhead image 200 which is generated based on the information of the images captured by the plurality of image capturing devices 11 to 16. The regions which are captured by the plurality of image capturing devices illustrated in FIG. 5 are regions based on the ground surface. As illustrated in FIG. 3, the periphery monitoring system 10 includes a plurality of (in the embodiment, six) image capturing devices 11, 12, 13, 14, 15, and 16, a plurality of (in the embodiment, eight) radar devices 21, 22, 23, 24, 25, 26, 27, and 28, the monitor 50, and a controller 100 as a monitoring control device.

<Image Capturing Device>

The image capturing devices 11, 12, 13, 14, 15, and 16 are attached to the dump truck 1. The image capturing devices 11, 12, 13, 14, 15, and 16 are, for example, a wide dynamic range (WDR) camera. The wide dynamic range camera is a camera that has a function of brightly correcting a dark portion to a level in which a bright portion is visible and adjusting the entire portion so as to be visible.

The image capturing devices 11, 12, 13, 14, 15, and 16 capture the periphery of the dump truck 1 and output the result as image information. In the description below, the image capturing device 11 is appropriately referred to as the first image capturing device 11, the image capturing device 12 is appropriately referred to as the second image capturing device 12, the image capturing device 13 is appropriately referred to as the third image capturing device 13, the image capturing device 14 is appropriately referred to as the fourth image capturing device 14, the image capturing device 15 is appropriately referred to as the fifth image capturing device 15, and the image capturing device 16 is appropriately referred to as the sixth image capturing device 16. Further, when there is no need to distinguish these image capturing devices, these image capturing devices are appropriately referred to as the image capturing devices 11 to 16.

As illustrated in FIG. 4, six image capturing devices 11 to 16 are attached to the outer peripheral portion of the dump truck 1 so as to capture the image in the range of 360° around the dump truck 1. In the embodiment, each of the image capturing devices 11 to 16 has a field of view of 120° (±60°) in the left and right direction and 96° in the height direction, but the field of view is not limited thereto. Further, in FIG. 4, the field of view is indicated by the arrows from the respective image capturing devices 11 to 16, but the direction indicated by the arrow indicates the direction in which the respective image capturing devices 11 to 16 face.

As illustrated in FIG. 4, the first image capturing device 11 is attached to the front surface of the dump truck 1. Specifically, the first image capturing device 11 is disposed at the upper end of the inclined ladder 2d, and more specifically, the lower side of the landing portion of the uppermost stage. The first image capturing device 11 is fixed through the bracket which is attached to the upper deck 2b so as to face the front side of the dump truck 1. As illustrated in FIG. 5, the first image capturing device 11 captures a first region 11C in the region existing in the periphery of the dump truck 1 and outputs first image information as image information. The first region 11C is a region which is broadened toward the front side of the vehicle body portion 2 of the dump truck 1.

As illustrated in FIG. 4, the second image capturing device 12 is attached to one side portion of the front surface of the dump truck 1. Specifically, the second image capturing device 12 is disposed at the right portion of the front surface of the upper deck 2b. The second image capturing device 12 is fixed through the bracket attached to the upper deck 2b so as to face the diagonally forward right side of the dump truck 1. As illustrated in FIG. 5, the second image capturing device 12 captures a second region 12C in the region existing in the periphery of the dump truck 1 and outputs second image information as image information. The second region 12C is a region which is broadened toward the diagonally forward right side of the vehicle body portion 2 of the dump truck 1.

As illustrated in FIG. 4, the third image capturing device 13 is attached to the other side of the front surface of the dump truck 1. Specifically, the third image capturing device 13 is disposed at the left portion of the front surface of the upper deck 2b. Then, the third image capturing device 13 is disposed so as to be bilaterally symmetric to the second image capturing device 12 about the axis passing the center of the dump truck 1 in the vehicle width direction. The third image capturing device 13 is fixed through the bracket attached to the upper deck 2b so as to face the diagonally forward left side of the dump truck 1. As illustrated in FIG. 5, the third image capturing device 13 captures a third region 13C in the region existing in the periphery of the dump truck 1 and outputs third image information as image information. The third region 13C is a region which is broadened toward the diagonally forward left side of the vehicle body portion 2 of the dump truck 1.

As illustrated in FIG. 4, the fourth image capturing device 14 is attached to one side surface of the dump truck 1. Specifically, the fourth image capturing device 14 is disposed at the front portion of the right side surface of the upper deck 2b. The fourth image capturing device 14 is fixed through the bracket attached to the upper deck 2b so as to face the diagonally backward right side of the dump truck 1. As illustrated in FIG. 5, the fourth image capturing device 14 captures a fourth region 14C in the region existing in the periphery of the dump truck 1 and outputs fourth image information as image information. The fourth region 14C is a region which is broadened toward the diagonally backward right side of the vehicle body portion 2 of the dump truck 1.

As illustrated in FIG. 4, the fifth image capturing device 15 is attached to the other side surface of the dump truck 1. Specifically, the fifth image capturing device 15 is disposed at the front portion of the left side surface of the upper deck 2b. Then, the fifth image capturing device 15 is disposed so as to be bilaterally symmetric to the fourth image capturing device 14 about the axis passing the center of the dump truck 1 in the vehicle width direction. As illustrated in FIG. 5, the fifth image capturing device 15 captures a fifth region 15C in the region existing in the periphery of the dump truck 1 and outputs fifth image information as image information. The fifth region 15C is a region which is broadened toward the diagonally backward left side of the vehicle body portion 2 of the dump truck 1.

As illustrated in FIG. 4, the sixth image capturing device 16 is attached to the rear portion of the dump truck 1. Specifically, the sixth image capturing device 16 is disposed above an axle housing connecting two rear wheels 6 and 6 at the rear end of the frame 2f and near the rotary shaft of the vessel 4. The sixth image capturing device 16 is fixed toward the rear side of the dump truck 1 through the bracket which is attached to a crossbar connecting the left and right frames 2f. As illustrated in FIG. 5, the sixth image capturing device 16 captures a sixth region 16C in the region existing in the periphery of the dump truck 1 and outputs sixth image information as image information. The sixth region 16C is a region which is broadened toward the rear side of the vehicle body portion 2 of the dump truck 1.

By using the above-described six image capturing devices 11 to 16, the periphery monitoring system 10 according to the embodiment may capture the images in the entire circumference of the dump truck 1 by 360° and acquire the image information as illustrated in FIG. 5. Six image capturing devices 11 to 16 transmit the first image information to the sixth image information as the respectively captured image information items to the controller 100 illustrated in FIG. 3.

The first image capturing device 11, the second image capturing device 12, the third image capturing device 13, the fourth image capturing device 14, and the fifth image capturing device 15 are provided in the upper deck 2b which is positioned at a comparatively high position. For this reason, the controller 100 may obtain an image which is obtained when the first image capturing device 11 to the fifth image capturing device 15 see from the upside toward the ground surface and may widely capture an object such as a vehicle existing in the ground surface. Further, even when the controller 100 executes the viewing point changing when generating a bird's eye image 200 illustrated in FIG. 5 from the first image information to the sixth image information acquired by the first image capturing device 11 to the sixth image capturing device 16, since the first image information to the fifth image information in the first image information to the sixth image information are the information items which may be obtained by the capturing operation from the upside, the deformation of the three-dimensional object is suppressed.

<Radar Device>

Figure 6:
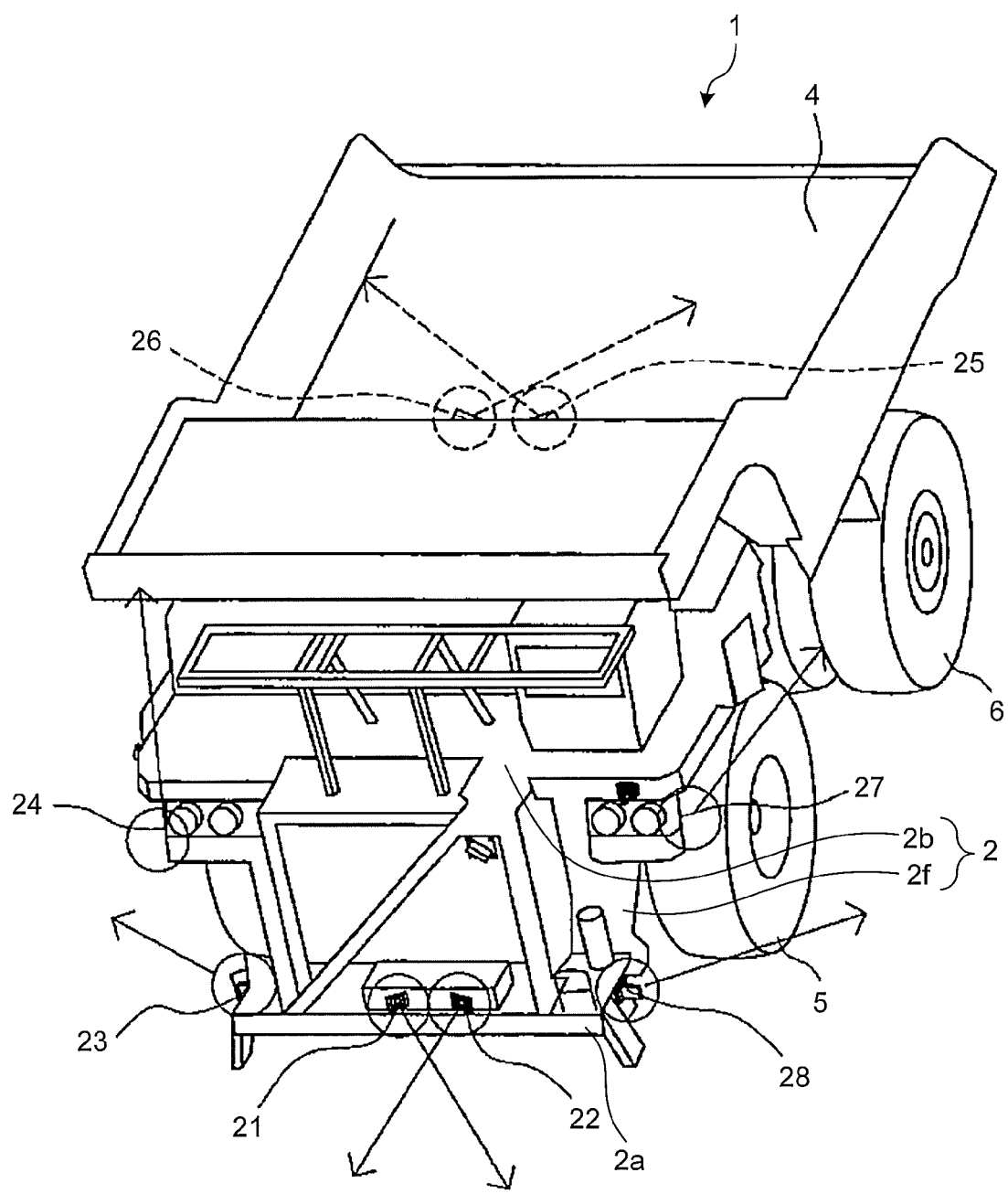
FIG. 6 is a perspective view illustrating an arrangement of radar devices 21 to 28.
Figure 7:
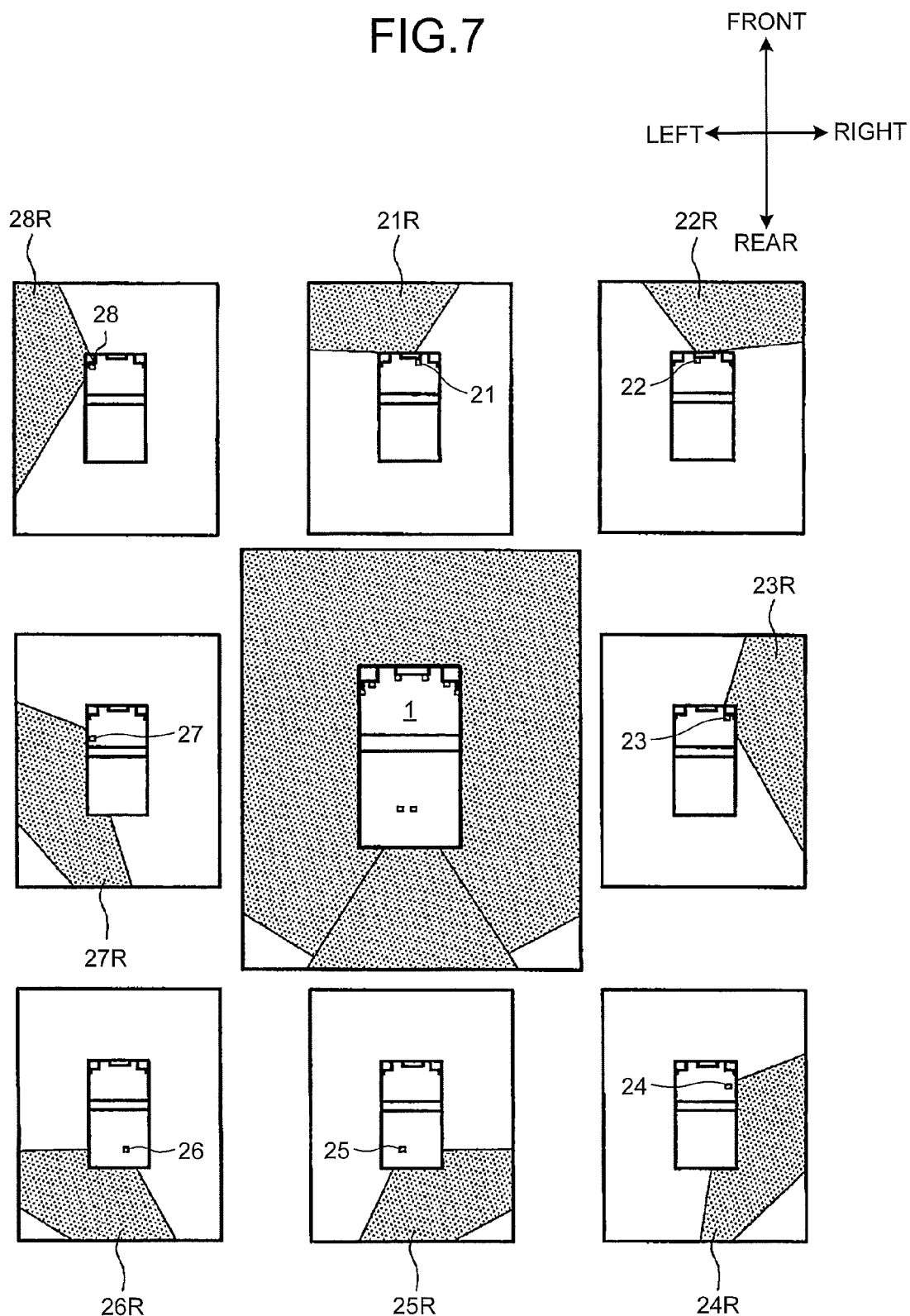
FIG. 7 is a diagram illustrating the detection ranges of the radar devices 21 to 28.

FIG. 6 is a perspective view illustrating an arrangement of the radar devices 21 to 28. FIG. 7 is a diagram illustrating the detection ranges of the radar devices 21 to 28. In the embodiment, the radar devices 21, 22, 23, 24, 25, 26, 27, and 28 (hereinafter, appropriately referred to as the radar devices 21 to 28) as the object detecting devices are UWB (Ultra Wide Band) radars (ultra wideband radars) having an orientation of 80° (±40°) and a maximum detection distance of 15 m or more. The radar devices 21 to 28 detect a position (a relative position) of the dump truck 1 with respect to the object existing around the dump truck 1. The respective radar devices 21 to 28 are attached to the outer peripheral portion of the dump truck 1 as similar to the image capturing devices 11 to 16. Further, in FIG. 6, each field of view is indicated by each of the arrows from the radar devices 21 to 28, but the directions indicated by the arrows indicate the directions of the detection ranges of the respective radar devices 21 to 28.

As illustrated in FIG. 6, the radar device 21 (appropriately referred to as the first radar device 21) is disposed at the front surface of the vehicle body portion 2 in the lower deck 2a disposed at a height of about 1 m from the ground and the slightly right side in relation to the center of the width direction of the vehicle body portion 2. As illustrated in FIG. 7, a detection range 21R of the first radar device 21 becomes a range which is widened toward the diagonally forward left side from the front side of the vehicle body portion 2 of the dump truck 1.

As illustrated in FIG. 6, the radar device 22 (appropriately referred to as the second radar device 22) is disposed at the front surface of the vehicle body portion 2 in the lower deck 2a so as to be positioned at the slightly left side in relation to the center of the vehicle width direction of the vehicle body portion 2. That is, the second radar device 22 is disposed at the left side of the first radar device 21 so as to be adjacent to the first radar device 21. As illustrated in FIG. 7, a detection range 22R of the second radar device 22 becomes a range which is widened toward the diagonally forward right side from the front side of the vehicle body portion 2 of the dump truck 1.

As illustrated in FIG. 6, the radar device 23 (appropriately referred to as the third radar device 23) is disposed near the front end of the right side surface of the lower deck 2a. As illustrated in FIG. 7, a detection range 23R of the third radar device 23 becomes a range which is widened toward the right side from the diagonally forward right side of the vehicle body portion 2 of the dump truck 1.

As illustrated in FIG. 6, the radar device 24 (appropriately referred to as the fourth radar device 24) is disposed near the right end at a height position between the lower deck 2a and the upper deck 2b at the side portion of the vehicle body portion 2. As illustrated in FIG. 7, a detection range 24R of the fourth radar device 24 becomes a range which is widened toward the rear side from the right side of the vehicle body portion 2 of the dump truck 1.

As illustrated in FIG. 6, the radar device 25 (appropriately referred to as the fifth radar device 25) is disposed below the vessel 4 and above an axle which transmits a driving force to the left and right rear wheels 6 of the dump truck 1. As illustrated in FIG. 7, a detection range 25R of the fifth radar device 25 becomes a range which is widened toward the rear side from the diagonally backward right side of the vehicle body portion 2 of the dump truck 1.

As illustrated in FIG. 6, the radar device 26 (appropriately referred to as the sixth radar device 26) is disposed adjacent to the right side of the fifth radar device 25 above the axle as in the fifth radar device 25. As illustrated in FIG. 7, a detection range 26R of the sixth radar device 26 becomes a range which is widened toward the rear side from the diagonally backward left side of the vehicle body portion 2 of the dump truck 1 so as to intersect the detection range of the fifth radar device 25.

As illustrated in FIG. 6, the radar device 27 (appropriately referred to as the seventh radar device 27) is disposed near the left end at the height position between the lower deck 2a and the upper deck 2b in the side surface of the vehicle body portion 2, that is, a position bilaterally symmetric to the fourth radar device 24 about the center axis in the vehicle width direction of the vehicle body portion 2. As illustrated in FIG. 7, a detection range 27R of the seventh radar device 27 becomes a range which is widened toward the rear side from the left side of the vehicle body portion 2 of the dump truck 1.

As illustrated in FIG. 6, the radar device 28 (appropriately referred to as the eighth radar device 28) is disposed near the front end in the left side surface of the lower deck 2a, that is, a position bilaterally symmetric to the third radar device 23 about the center axis in the vehicle width direction of the vehicle body portion 2. As illustrated in FIG. 7, a detection range 28R of the eighth radar device 28 becomes a range which is widened toward the left side from the diagonally forward left side of the vehicle body portion 2 of the dump truck 1.

As illustrated in FIG. 7, eight radar devices 21 to 28 may detect the relative position between the object and the dump truck 1 in the detection range as the entire circumference of 360° of the dump truck 1. Eight radar devices 21 to 28 transmit the relative position information representing the relative position between each detected object and the dump truck 1 to the controller 100. In this way, the plurality of (eight) radar devices 21 to 28 are provided in the vehicle body portion 2 and may detect the subject existing in the entire circumferential range of the vehicle body portion 2. Next, the controller 100 which is included in the periphery monitoring system 10 will be described.

<Controller>

The controller 100 illustrated in FIG. 3 displays the existence of the object around the dump truck 1 in the bird's eye image 200 (see FIG. 5) by using the image capturing devices 11 to 16 and the radar devices 21 to 28 and notifies the existence of the object to the operator if necessary. As illustrated in FIG. 3, the controller 100 includes a bird's eye image synthesizing unit 110, a camera image switching/viewing point changing unit 120, an object position information generating unit 130, a display control unit 140, an alarm notifying unit 150, an alarm releasing unit 160, an object information collecting unit 210, and an object processing unit 220.

As illustrated in FIG. 3, the bird's eye image synthesizing unit 110 is connected to the image capturing devices 11 to 16. The bird's eye image synthesizing unit 110 receives a plurality of image information items (the first image information to the sixth image information) which are captured and generated by the respective image capturing devices 11 to 16. Then, the bird's eye image synthesizing unit 110 synthesizes the images corresponding to the plurality of received image information items and generates the bird's eye image 200 including the entire circumference of the dump truck 1. Specifically, the bird's eye image synthesizing unit 110 generates bird's eye image information for displaying the bird's eye image 200 obtained by projecting the plurality of images onto a predetermined projection plane on the monitor 50 through the respective coordinate conversions of the plurality of image information items. The bird's eye image information will be described later.

As illustrated in FIG. 3, the camera image switching/viewing point changing unit 120 is connected to the image capturing devices 11 to 16. Then, the camera image switching/viewing point changing unit 120 changes the images captured by the respective image capturing devices 11 to 16 and displayed on the screen of the monitor 50 along with the bird's eye image 200 in response to the detection result of the obstacle detected by, for example, the radar devices 21 to 28. Further, the camera image switching/viewing point changing unit 120 converts the image information acquired by the respective image capturing devices 11 to 16 into the image information from the viewing point of the upward infinity.

As illustrated in FIG. 3, the object position information generating unit 130 is connected to the camera image switching/viewing point changing unit 120, the display control unit 140, and the object processing unit 220. The object position information generating unit 130 generates the object position information for synthesizing and displaying the object position information acquired by the radar devices 21 to 28 in the bird's eye image 200 which is formed by synthesizing the image information acquired by the respective image capturing devices 11 to 16 and transmits the result to the camera image switching/viewing point changing unit 120 and the display control unit 140.

As illustrated in FIG. 3, the display control unit 140 is connected to the bird's eye image synthesizing unit 110, the camera image switching/viewing point changing unit 120, the object position information generating unit 130, and the alarm notifying unit 150. The display control unit 140 generates the bird's eye image 200 including the position of the object based on the object position information in the entire circumference of the dump truck 1 acquired by the radar devices 21 to 28 and the bird's eye image information in the entire circumference of the dump truck 1 generated by the bird's eye image synthesizing unit 110. The image is displayed on the monitor 50. Further, the display control unit 140 displays the first image in which the mark indicating the subject (hereinafter, appropriately referred to as the object) existing around the dump truck 1 and detected by the radar devices 21 to 28 overlaps the bird's eye image 200 based on the bird's eye image information and the second image captured by the image capturing devices 11 to 16 on the same screen of the monitor 50.

As illustrated in FIG. 3, the alarm notifying unit 150 is connected to the display control unit 140. The alarm notifying unit 150 notifies an alarm by at least one of a first alarm in which a region with the mark indicating the object in the first image is displayed in a manner different from the region without the mark and a second alarm which notifies the existence of the object by a sound. In the embodiment, since the alarm notifying unit 150 notifies both the first alarm and the second alarm, the alarm notifying unit 150 is connected with a sound generating device 52. The sound generating device 52 is formed by the combination of, for example, a sound signal generating device, an amplifying device, and a speaker. In the embodiment, the device which notifies various alarms to the operator of the dump truck 1 by a sound also serves as the sound generating device 52 of the periphery monitoring system 10. In this way, since the speaker which is dedicated for the periphery monitoring system 10 is not needed, the manufacturing cost of the periphery monitoring system 10 may be reduced. Further, the alarm notifying unit 150 is electrically connected with the shift lever 37, and more specifically, a sensor 37a that detects the position of the shift lever 37. The signal which indicates the position of the shift lever 37 corresponds to the running mode of the dump truck 1. Accordingly, the alarm notifying unit 150 may acquire a signal representing the running mode of the dump truck 1 from the shift lever 37. The signal is, for example, a signal representing the advancing direction of the dump truck 1 or a signal representing a gear shifting position.

The alarm releasing unit 160 releases the alarm in accordance with a releasing order based on the existing position of the object based on a signal (alarm releasing signal) representing the release of the alarm from an alarm releasing switch 53 as an alarm releasing instruction unit that receives an input for releasing the alarm notified by the alarm notifying unit 150. The alarm releasing switch 53 is provided in the control panel 51 illustrated in FIG. 2. The alarm releasing switch 53 is electrically connected to the alarm releasing unit 160. Furthermore, a touch panel may be used as the monitor 50 and the function of the alarm releasing switch 53 may be exhibited by touching the touch panel with a finger. With such a structure, when the alarm releasing switch 53 is operated by the operator of the dump truck 1 so as to release the alarm, the alarm releasing signal is transmitted to the alarm releasing unit 160. When the alarm releasing unit 160 receives the alarm releasing signal, the alarm releasing unit transmits an alarm releasing instruction to the alarm notifying unit 150. The above-described releasing order will be described later.

In the embodiment, the alarm releasing unit 160 changes the releasing order in response to the state of the dump truck 1. For this reason, the shift lever 37 and the vehicle speed sensor 54 as vehicle state detecting sensors for detecting the state of the dump truck 1 are electrically connected to the alarm releasing unit 160. The alarm releasing unit 160 changes the releasing order based on at least one of a signal representing the gear shifting position and a signal representing the stop or the advancing direction of the dump truck 1 acquired from the shift lever 37, and more specifically, the sensor 37a detecting the position of the shift lever 37 or the running speed (the vehicle speed) of the dump truck 1 detected by the vehicle speed sensor 54. The sensor 37a may detect the gear shifting position selected by the shift lever 37, but the alarm releasing unit 160 or the alarm notifying unit 150 may determine the advancing direction or the stop of the dump truck 1 by using a signal representing the gear shifting position. In the embodiment, a case will be described in which the releasing order, that is, the priority is changed based on a signal representing the stop or the advancing direction of the dump truck 1 acquired from the sensor 37a. Furthermore, the vehicle speed sensor 54 illustrated in FIG. 3 is not essentially needed in the embodiment.

As illustrated in FIG. 3, the object information collecting unit 210 is connected to the radar devices 21 to 28 and the object processing unit 220. The object information collecting unit 210 receives the object detection result in each detection range from the radar devices 21 to 28 and transmits the result to the object processing unit 220.

As illustrated in FIG. 3, the object processing unit 220 is connected to the object information collecting unit 210 and the object position information generating unit 130. The object processing unit 220 transmits the object position information received from the object information collecting unit 210 to the object position information generating unit 130.

The controller 100 is configured by the combination of, for example, a computer including a CPU (Central Processing Unit) as a calculation device and a memory as a storage device and an image processing device (for example, an image board) executing an image process such as a synthesis of the bird's eye image. The image processing device is equipped with, for example, an exclusive IC (for example, FPGA: Field-Programmable Gate Array) executing an image process such as a synthesis of the bird's eye image, a memory (for example, VRAM: Video Random Access Memory), and the like.

In the embodiment, as illustrated in FIG. 4, the image capturing devices 11 to 16 are disposed at the front surface and the side surface of the upper deck 2b and below the vessel 4. Then, the controller 100 generates the bird's eye image 200 illustrated in FIG. 5 by synthesizing the first image information to the sixth image information captured and acquired by the image capturing devices 11 to 16 and displays the result on the monitor 50 which is disposed at the front side of the driver seat 31 inside the cab 3. At this time, the monitor 50 displays an image such as the bird's eye image 200 in response to the control of the controller 100. The bird's eye image 200 may be obtained by the controller 100 through the synthesizing of the first image information to the sixth image information corresponding to a first region 11C to a sixth region 16C captured by the image capturing devices 11 to 16. The periphery monitoring system 10 displays the bird's eye image 200 on the monitor 50. For this reason, the operator of the dump truck 1 may monitor the entire range of 360° around the dump truck 1 just by seeing the bird's eye image 200 displayed on the monitor 50. Next, the bird's eye image 200 will be described.

<Generation of Bird's Eye Image>

Figure 8:
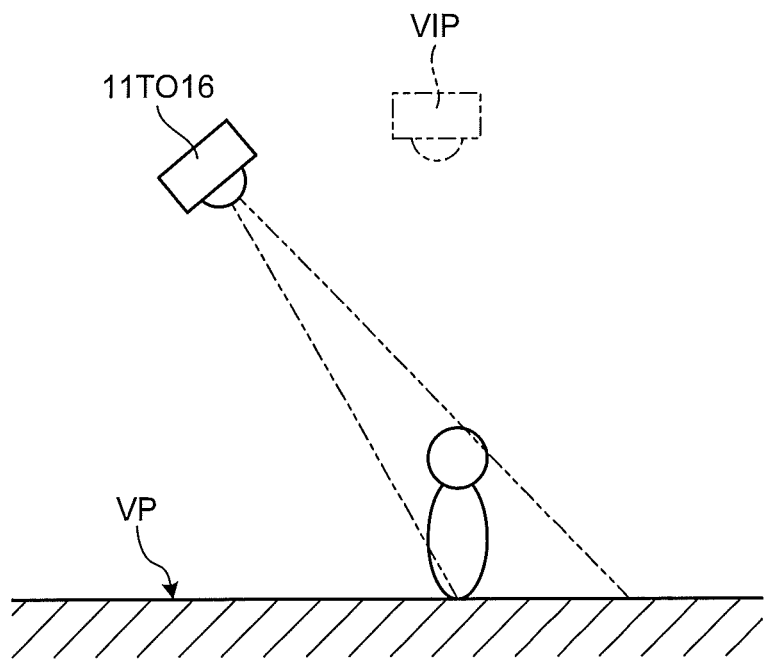
FIG. 8 is a diagram illustrating an image converting method using a virtual projection plane VP.

FIG. 8 is a diagram illustrating an image converting method using a virtual projection plane VP. The controller 100 generates the bird's eye image 200 around the dump truck 1 based on a plurality of images indicated by the plurality of first image information to the sixth image information. Specifically, the controller 100 executes the coordinate conversion of the first image information to the sixth image information by using predetermined conversion information. The conversion information is information representing a relation between the position coordinate of each pixel of the input image and the position coordinate of each pixel of the output image. In the embodiment, the input images are images captured by the image capturing devices 11 to 16, and are images corresponding to the first image information to the sixth image information. The output image is the bird's eye image 200 displayed on the monitor 50.

The controller 100 converts the images captured by the image capturing devices 11 to 16 into an image seen from a predetermined virtual viewing point positioned above the dump truck 1 by using conversion information. Specifically, as illustrated in FIG. 5, the images captured by the image capturing devices 11 to 16 are projected onto the predetermined virtual projection plane VP, so that the images are converted into an image seen from the virtual viewing point VIP positioned above the dump truck 1. The conversion information indicates the virtual projection plane VP. The converted image is the bird's eye image displayed on the monitor 50. The controller 100 generates the bird's eye image 200 around the dump truck 1 by projecting the plurality of first image information to the sixth image information acquired from the plurality of image capturing devices 11 to 16 onto the predetermined virtual projection plane VP and synthesizing the images.

As illustrated in FIG. 5, the regions around the dump truck 1 captured by the respective image capturing devices 11 to 16 overlap one another in the first overlapping region OA1 to the sixth overlapping region OA6. The controller 100 overlaps and displays the images corresponding to two adjacent image information items of the first image information to the sixth image information from the image capturing devices 11 to 16 in the first overlapping region OA1 to the sixth overlapping region OA6 in the bird's eye image 200.

Specifically, the controller 100 overlaps and displays the image of the first image information from the first image capturing device 11 and the image of the third image information from the third image capturing device 13 in the first overlapping region OA1. Further, the controller 100 overlaps and displays the image of the first image information from the first image capturing device 11 and the image of the second image information from the second image capturing device 12 in the second overlapping region OA2. Further, the controller 100 overlaps and displays the image of the third image information from the third image capturing device 13 and the image of the fifth image information from the fifth image capturing device 15 in the third overlapping region OA3. Further, the controller 100 overlaps and displays the image of the second image information from the second image capturing device 12 and the image of the fourth image information from the fourth image capturing device 14 in the fourth overlapping region OA4. Further, the controller 100 overlaps and displays the image of the fifth image information from the fifth image capturing device 15 and the image of the sixth image information from the sixth image capturing device 16 in the fifth overlapping region OA5. Further, the controller 100 overlaps and displays the image of the fourth image information from the fourth image capturing device 14 and the image of the sixth image information from the sixth image capturing device 16 in the sixth overlapping region OA6.

In this way, in a case where two image information items are synthesized in an overlapping state in the first overlapping region OA1 to the sixth overlapping region OA6, a value obtained by multiplying the values of the first image information to the sixth image information by the synthesis ratio is added. The synthesis ratio is a value corresponding to the first image information to the sixth image information, and is stored in the controller 100. For example, the synthesis ratio of the first image information is 0.5 and the synthesis ratio of the second image information is 0.5. In this way, the synthesis ratio is defined for each of the first image information to the sixth image information. Since the synthesis ratio is used, the plurality of image information items in the first overlapping region OA1 to the sixth overlapping region OA6 are averaged and displayed. As a result, the controller 100 may generate the natural bird's eye image 200 by suppressing an abrupt change in color and contrast. The controller 100 generates the synthesis image information for displaying the bird's eye image 200 synthesized as described above and outputs the result to the monitor 50.

<Image Capturing Range of Each Image Capturing Device>

As illustrated in FIG. 4, in the dump truck 1, the first image capturing device 11, the second image capturing device 12, the third image capturing device 13, the fourth image capturing device 14, and the fifth image capturing device 15 are disposed in the upper deck 2b, and the sixth image capturing device 16 is disposed below the vessel 4 at the rear end of the frame 2f. In particular, the second image capturing device 12 and the third image capturing device 13 cover an image capturing region from the diagonally forward left and right sides of the vehicle body portion 2 of the dump truck 1 to the left and right sides. Further, the fourth image capturing device 14 and the fifth image capturing device 15 cover an image capturing region from the left and right sides of the vehicle body portion 2 of the dump truck 1 to the diagonally backward left and right sides. In this way, the controller 100 may monitor the periphery of the dump truck 1 by generating the bird's eye image 200 covering the entire circumference of the dump truck 1 in a manner such that the first image information and the sixth image information captured and acquired by the first image capturing device 11 and the sixth image capturing device 16 are added to each other.

Further, in the embodiment, as illustrated in FIG. 5, the adjacent image capturing devices 11 to 16 are disposed so that the first region 11C to the sixth region 16C as the image capturing regions of the respective image capturing devices 11 to 16 overlap each other at the adjacent portion. The controller 100 may monitor the entire circumference of 360° in the plane of the dump truck 1 by providing a connection line in the overlapping portions of the first region 11C to the sixth region 16C captured by the respective image capturing devices 11 to 16. Furthermore, the connection line connecting the adjacent first region 11C to the sixth region 16C in the bird's eye image 200 may be set to an arbitrary position in the overlapping region of the first region 11C to the sixth region 16C. Next, the control (appropriately referred to as the alarm releasing control) for releasing the alarm notified by the periphery monitoring system 10 will be described.

<Alarm Releasing Control>

Figure 9:
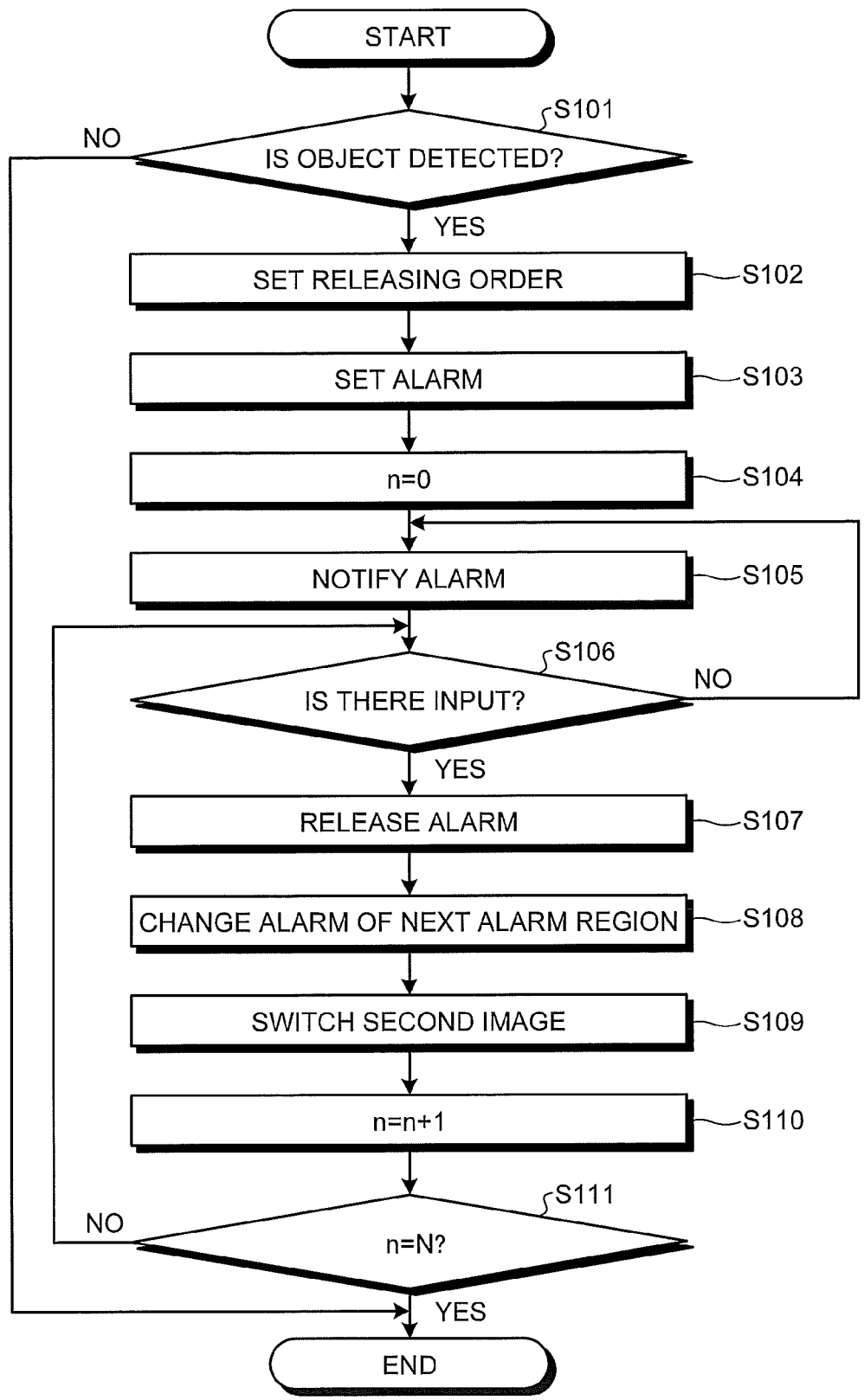
FIG. 9 is a flowchart illustrating a procedure of an alarm releasing control process of the periphery monitoring system 10.

FIG. 9 is a flowchart illustrating a procedure of the alarm releasing control process of the periphery monitoring system 10. The alarm releasing control according to the embodiment is characterized in that the alarm notified by the alarm notifying unit 150 of the controller 100 illustrated in FIG. 3 is released by the releasing order based on the existence position of the object. The releasing order may be set in accordance with the high priority in the position or the direction to be carefully monitored by the operator of the dump truck 1, for example, around the dump truck 1. The controller 100 illustrated in FIG. 3 executes the respective processes of the alarm releasing control according to the embodiment.

When executing the alarm releasing control according to the embodiment, in step S101, if at least one of the plurality of radar devices 21 to 28 detects any subject as the object around the dump truck 1 (Yes in step S101), the controller 100 causes the process to proceed to step S102. When the object is not detected around the dump truck 1 (No in step S101), the controller 100 ends the alarm releasing control according to the embodiment. In step S102, the controller 100, that is, the alarm releasing unit 160 selects and sets any releasing orders from data table 41 to be described later. Next, in step S103, the controller 100, that is, the alarm notifying unit 150 sets the alarm. The method of setting the alarm in step S103 will be described later in detail.

(Alarm and Releasing Order)

Figure 10:
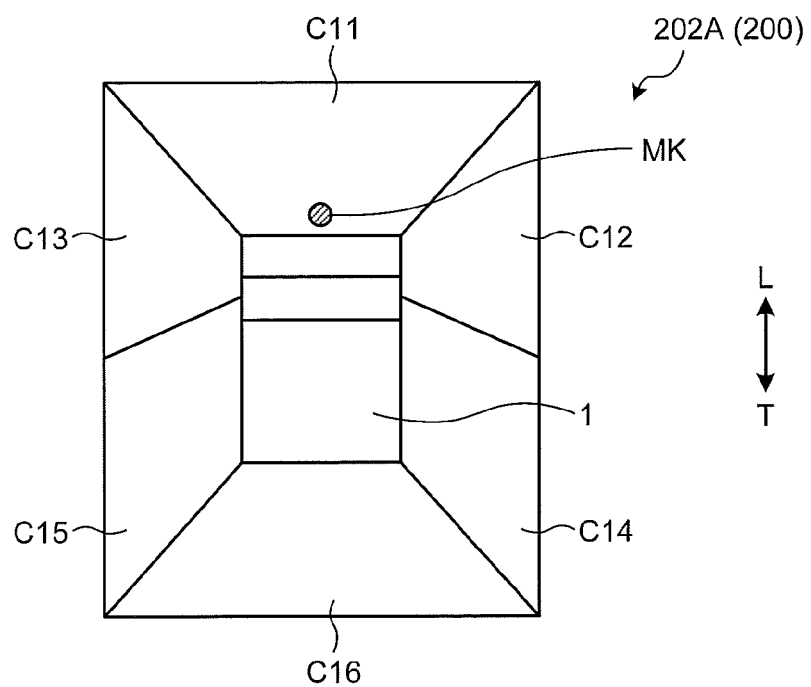
FIG. 10 is a diagram illustrating an example of a first image 202A which is used to notify a first alarm.

FIG. 10 is a diagram illustrating an example of a first image 202A used to notify the first alarm. In the drawing, the front side L of the dump truck 1 is illustrated and the rear side T of the dump truck 1 is illustrated. First, the first alarm will be described. In the embodiment, the first alarm which is notified by the alarm notifying unit 150 is notified by using the first image 202A illustrated in FIG. 10. Further, the second alarm which is notified by the alarm notifying unit 150 is notified by using an alarm sound as a sound generated by the sound generating device 52 illustrated in FIG. 3.

The first image 202A is an image in which a mark MK indicating the object detected by at least one of the plurality of radar devices 21 to 28 overlaps the bird's eye image 200. The first image 202A is displayed on the monitor 50. The first image 202A includes a first alarm region C11, a second alarm region C12, a third alarm region C13, a fourth alarm region C14, a fifth alarm region C15, and a sixth alarm region C16 respectively corresponding to the first region 11C, the second region 12C, the third region 13C, the fourth region 14C, the fifth region 15C, and the sixth region 16C illustrated in FIG. 5. The first alarm region C11 to the sixth alarm region C16 are regions around the dump truck 1 displayed on the first image 202A. The first alarm region C11 is a front region of the dump truck 1, the second alarm region C12 is a right front region of the dump truck 1, the third alarm region C13 is a left front region of the dump truck 1, the fourth alarm region C14 is a right rear region of the dump truck 1, the fifth alarm region C15 is a left rear region of the dump truck 1, and the sixth alarm region C16 is a rear region of the dump truck 1. In the description below, the first alarm region C11 to the sixth alarm region C16 are appropriately referred to as the alarm region when there is no need to distinguish the alarm regions.

The object such as a vehicle which is detected by at least one of the plurality of radar devices 21 to 28 is displayed as the mark MK while overlapping the first image 202A throughout any one or two regions of the first alarm region C11 to the sixth alarm region C16. The mark MK is displayed on the first alarm region C11 to the sixth alarm region C16 corresponding to the existence position of the object corresponding thereto. That is, when the object is detected in the first region 11C, the mark MK is displayed on the first alarm region C11. When the object is detected in the second region 12C, the mark MK is displayed on the second alarm region C12. Further, the position at which the object (the mark MK) is displayed on the first image 202A is a position which corresponds to the relative distance between the dump truck 1 and the object detected by the radar devices 21 to 28. For example, the case illustrated in FIG. 10 illustrates a case where the object is positioned comparatively near the front position of the dump truck 1.

As for the first alarm which is notified by the alarm notifying unit 150, the region with the mark MK is displayed in a manner different from the region without the mark MK in the first image 202A. For example, in the example illustrated in FIG. 10, the alarm notifying unit 150 causes the boundary line of the first alarm region C11 with the mark MK to blink, for example, red and the second alarm region C12 to the sixth alarm region C16 are not displayed in this way. In this way, the operator of the dump truck 1 may promptly and reliably see the region with the object. In this way, the first alarm allows the operator to visually recognize the alarm. In a case where a plurality of marks MK are present, the alarm notifying unit 150 causes the boundary line of the alarm region with each mark MK to blink while, for example, displaying the plurality of marks MK. Furthermore, the entire alarm region may blink instead of causing the periphery of the alarm region with the mark MK to blink.

In all alarm regions with the respective marks MK, the boundary lines may blink. However, in the embodiment, the boundary line of only the alarm region with the highest priority, that is, the releasing order corresponding to the running mode to be described later blinks, and the boundary line of the other alarm region is only highlighted (for example, the line is turned on in red). That is, it is desirable to distinguish the alarm region with the high priority from the other alarm regions among the plurality of alarm regions with the plurality of marks (objects). That is, this is because the operator may visually recognize the alarm region which needs the periphery monitoring the most when the plurality of objects are present in the different alarm regions. Furthermore, the entire alarm region may blink instead of causing only the boundary line of the alarm region with the mark MK to blink. Alternatively, the boundary line of the alarm region with the mark MK and the entire region (the portion other than the boundary line) may blink at the same time while being distinguished from each other. That is, the boundary line of the alarm region may be highlighted as, for example, red, and the portion other than the boundary line of the alarm region may be displayed as a specific color (for example, a translucent color of red), so that the boundary line and the portion other than the boundary line blink together. Next, the second alarm will be described.

Figure 11:
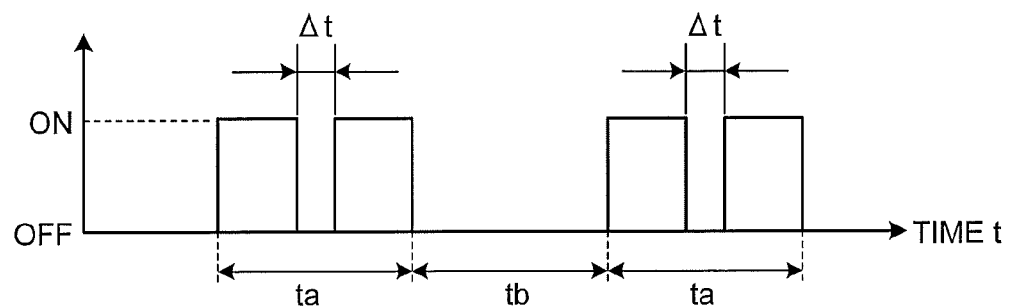
FIG. 11 is a diagram illustrating an alarm sound level.
Figure 15:
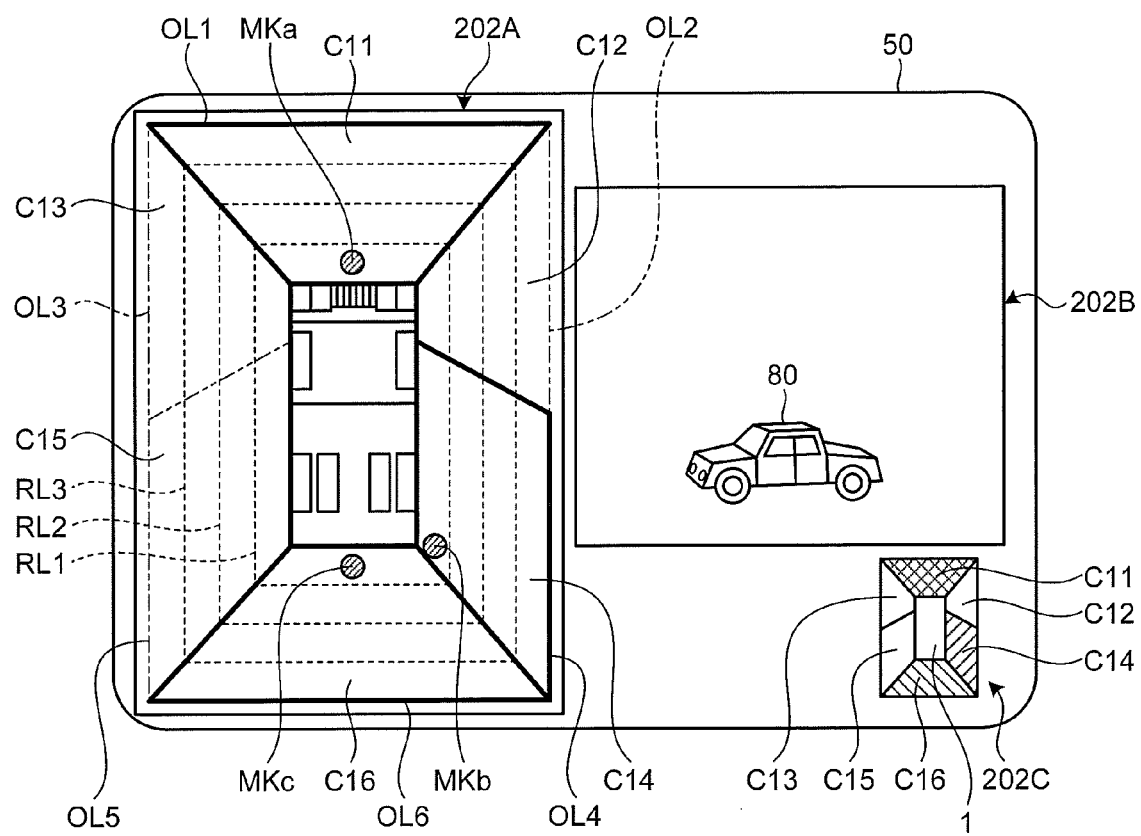
FIG. 15 is a diagram illustrating an example of a screen on which an alarm is displayed.

FIG. 11 is a diagram illustrating an alarm sound level. FIG. 12 is a diagram illustrating an example of the data table 40 illustrating the level of the alarm sound used to notify the second alarm. In the second alarm, the existence of the object detected by at least one of the plurality of radar devices 21 to 28 is notified by the alarm notifying unit 150 causing the sound generating device 52 to generate the alarm sound. For this reason, the second alarm causes the operator to recognize the alarm in terms of a sound. In the embodiment, as illustrated in FIG. 11, the alarm sound is notified by the combination of the time (ON) ta for generating the sound and the time (OFF) tb for stopping the generation of the sound. In the embodiment, the time (the stop time) Δt for stopping the sound is provided in the time ta for generating the sound, but the stop time Δt may not be provided.

In the embodiment, in the second alarm using the alarm sound, the notification mode is changed in accordance with the high priority in the position or the direction to be carefully monitored by the operator of the dump truck 1 around the dump truck 1. For example, when the driver seat is present at the left side in the advancing direction of the dump truck 1, the importance degree of the position or the direction to be carefully monitored by the operator decreases in order of the front side, the right front side, the left front side, the right rear side, the left rear side, and the rear side before the dump truck 1 advances, and hence the priority decreases in this order. The priority may be changed by a state such as a running mode or a running speed of the dump truck 1.

In a case where the second alarm notification mode, that is, the alarm sound generation mode is changed, for example, the alarm notifying unit 150 differentiates the sound generation time to and the sound generation stop time tb in response to the priority described above. In this way, the alarm sound level is set in response to the priority. In the embodiment, for example, as illustrated in the data table 40 of FIG. 12, the respective sound generation time periods are set to satisfy the inequation of tah<tam<tal and the respective sound generation stop time periods are set to satisfy the inequation of tbh<tbm<tbl when the alarm sound level is the high (H), the middle (M), and the low (L). In this way, the alarm sound level may be changed in response to the above-described priority. Further, since the alarm sound level may be differentiated without changing the tone and the volume of the alarm sound, a high-degree sound process is not needed. The data table 40 is stored in the storage unit which is provided in the controller 100.

In the embodiment, the alarm notifying unit 150 of the controller 100 may notify at least one of the first alarm of causing the operator of the dump truck 1 to recognize the alarm in terms of a vision and the second alarm of causing the operator to recognize the alarm in terms of a sound. In a case where only the first alarm is notified, since there is no sound, the inside of the cab 3 may be maintained in a quiet environment. In a case where only the second alarm is notified, the operator may recognize the existence of the object around the dump truck 1 even when the operator may not see the monitor 50. Since the alarm notifying unit 150 notifies the alarm in different modes, that is, the first alarm and the second alarm, the operator may further reliably recognize the existence of the object around the dump truck 1. When the controller 100 detects at least one object, both the first alarm (vision) and the second alarm (sound) may be simultaneously notified as the alarm. When the alarms are notified at the same time, the alarm is notified to the operator with a high alarm level. Accordingly, it is possible to reduce the possibility (the possibility in which the operator may not see the first alarm or listen to the second alarm) in which the operator ignores the object. Next, the releasing order will be described.

FIG. 13 is a diagram illustrating an example of the data table 41 illustrating the releasing order. In the embodiment, the releasing order of the alarm, that is, at least one of the first alarm and the second alarm is set in accordance with the high-priority rank described above. For example, as described above, in a case where the dump truck 1 does not advance yet, that is, the running mode is maintained at the forward (F), the priority decreases in order of the front side, the right front side, the left front side, the right rear side, the left rear side, and the rear side. For this reason, as illustrated in the data table 41 of FIG. 13, the releasing order when the running mode is the forward (F) is set as the order of the front side, the right front side, the left front side, the right rear side, the left rear side, and the rear side, and the releasing order is selected and set.

For example, a case will be considered in which the running mode is the forward (F) and the alarm is notified as the first alarm by causing all the peripheries of the first alarm region C11 to the sixth alarm region C16 to blink due to existence of the mark MK in all the first alarm region C11 to the sixth alarm region C16 in the first image 202A illustrated in FIG. 10. In this case, the operator of the dump truck 1 releases the alarm by operating the alarm releasing switch 53 illustrated in FIG. 3. Whenever the operator operates the alarm releasing switch 53, the alarm is released in order of the front side, the right front side, the left front side, the right rear side, the left rear side, and the rear side in accordance with the set releasing order. That is, the blinking state is released in order of the first alarm region C11, the second alarm region C12, the third alarm region C13, the fourth alarm region C14, the fifth alarm region C15, and the sixth alarm region C16.

In the embodiment, in a case where the dump truck 1 is maintained at the standby state while the running mode is the forward (F), the alarm sound is selected and set in accordance with the releasing order, that is, the priority when the running mode of the data table 41 of FIG. 13 is the forward (F), and the second alarm is set so that the alarm sound levels of the front side, the right front side, and the left front side are set to the high (H) and the alarm sound levels of the right rear side, the left rear side, and the rear side are set to the middle (M). That is, when the mark MK exists in at least one of the first alarm region C11, the second alarm region C12, and the third alarm region C13, the alarm sound level is the high (H). Further, when the mark MK exists in at least one of the fourth alarm region C14, the fifth alarm region C15, and the sixth alarm region C16, the alarm sound level is the middle (M).

A case will be considered in which the mark MK exists in all the first alarm region C11 to the sixth alarm region C16 in the first image 202A illustrated in FIG. 10. In this case, the case where the mark MK exists in the first alarm region C11 with the highest priority is prioritized, and the alarm sound at the alarm sound level corresponding to the first alarm region C11 is notified as the second alarm. That is, the alarm sound level is the high (H). Whenever the operator operates the alarm releasing switch 53, the second alarm is released. Here, the first alarm may be also released along with the release of the second alarm. That is, whenever the operator operates the alarm releasing switch 53, the first alarm may be released. When the operator operates the alarm releasing switch 53, the second alarm corresponding to the existence of the mark MK in the first alarm region C11 is first released. Here, in a case where the first alarm is also released, the second alarm of the first alarm region C11 is released. Hereinafter, the first alarm of each of the alarm regions C12 to C16 is released by the operation of the alarm releasing switch 53 from the operator as in the case where the first alarm is released along with the release of the second alarm of each of the alarm regions C12 to C16. Then, the second alarm corresponding to the existence of the mark MK in the second alarm region C12 with the high priority at the next place is notified. In this case, as illustrated in the data table 41 of FIG. 13, the alarm sound of which the alarm sound level is the high (H) is notified as the second alarm. Next, when the operator operates the alarm releasing switch 53, the second alarm corresponding to the existence of the mark MK in the second alarm region C12 is released, and the second alarm corresponding to the existence of the mark MK in the third alarm region C13 with the high priority at the second place is notified. In this case, as illustrated in the data table 41 of FIG. 13, the alarm sound of which the alarm sound level is the high (H) is notified as the second alarm. Then, when the operator operates the alarm releasing switch 53 so that the second alarm corresponding to the existence of the mark MK in the third alarm region C13 is released, the second alarm corresponding to the existence of the mark MK in the fourth alarm region C14 with the high priority at the next place is notified. In this case, as illustrated in the data table 41 of FIG. 13, the alarm sound of which the alarm sound level is the middle (M) is notified as the second alarm. When the operator sequentially operates the alarm releasing switch 53 so as to release the second alarm corresponding to the existence of the mark MK in the sixth alarm region C16, the alarm sound is stopped. In this way, the second alarm is notified and released. Here, a case has been described in which the first alarm is released along with the release of the second alarm, but the release of the first alarm will be described later in detail.

In the embodiment, as illustrated in the data table 41, the releasing order, that is, the priority is changed in response to the state of the dump truck 1, that is, the running mode. The change is performed by the alarm releasing unit 160. The releasing order, that is, the priority in each of the cases where the running mode is the forward (F), the neutral (N), the stop (P), and the reverse (R) is illustrated in, for example, the data table 41. The running mode is switched by the shift lever 37 illustrated in FIG. 3. The data table 41 is stored in a storage unit (not illustrated) including a memory provided in the controller 100. The releasing order, that is, the priority is not limited to the description of the data table 41. Next, the releasing order, that is, the priority in each running mode will be described.

In a case where the running mode is the forward (F), as described above, the releasing order, that is, the priority is set as the order of the front side (the first alarm region C11), the right front side (the second alarm region C12), the left front side (the third alarm region C13), the right rear side (the fourth alarm region C14), the left rear side (the fifth alarm region C15), and the rear side (the sixth alarm region C16). In this case, since the dump truck 1 is in a state to run forward, the front side is most important in the position or the direction to be carefully monitored by the operator of the dump truck 1. Further, in the embodiment, since the driver seat 31 is provided at the left side in the dump truck 1, as the position or the direction to be carefully monitored by the operator at the next place, the right front side in which the operator may not easily see the object among the left front side and the right front side is important, that is, the priority is high at the next place of the front side. Here, when the driver seat 31 is provided at the right side, the left front side is important at the next place of the front side. Hereinafter, as the releasing order, that is, the priority, the priority of the front side is the highest, and the priority is set in order of the left front side, the right rear side, the left rear side, and the rear side. If the driver seat 31 is provided at the right side, the releasing order and the priority are set in order of the left front side, the right front side, the left rear side, the right rear side, and the rear side. The alarm sound level is the high (H) at the front side, the right front side, and the left front side, and is the middle (M) at the right rear side, the left rear side, and the rear side. Since the alarm sound level at the front side of the dump truck 1 is set to be higher than that of the rear side, it is possible to cause the operator to further reliably recognize the existence of the object at the front side which is important before the dump truck 1 advances.

When the running mode is the neutral (N), there is a possibility that the dump truck 1 may run forward or backward. For this reason, the releasing order, that is, the priority is set in order of the front side (the first alarm region C11), the rear side (the sixth alarm region C16), the right front side (the second alarm region C12), the right rear side (the fourth alarm region C14), the left front side (the third alarm region C13), and the left rear side (the fifth alarm region C15). The alarm sound level is the middle (M) at the front side and the rear side, and is the low (L) at the right front side, the right rear side, the left front side, and the left rear side. In the case of the neutral (N), the dump truck 1 does not run when the operator operates the shift lever 37 so as not to switch the running mode to the forward (F) or the reverse (R). Further, in a case where the running mode is the neutral (N), the operator is maintained at the standby state. For this reason, in the embodiment, in a case where the running mode is the neutral (N), the alarm sound level is lower than the case where the running mode is the forward (F). In this way, it is possible to cause the operator to recognize the object existing around the dump truck 1 while suppressing the alarm sound from becoming noisy with respect to the operator in the standby state.

The releasing order, that is, the priority in a case where the running mode is the stop (P) is the same as that of the case where the running mode is the neutral (N). The alarm sound level is none (NA) in all releasing orders, that is, priorities. In the embodiment, the case where the running mode is the stop (P) indicates a state where the shift lever 37 is present at the parking position and the service brake of the rear wheel 6 is locked (braked by the brake) by a hydraulic system (not illustrated). The service brake may not be the hydraulic system, but a mechanical brake which mechanically brakes a brake disk. In order to cause the dump truck 1 to be able to run when the running mode is the stop (P), the operator needs to operate the shift lever 37, switch the running mode from the stop (P) to the forward (F) or the reverse (R) through the neutral (N), and then release the lock of the service brake of the rear wheel. Further, in a case where the running mode is the stop (P), it is considered that the operator is in a standby state as in the case where the running mode is the neutral (N). For this reason, in the embodiment, in a case where the running mode is the stop (P), the alarm sound level is set to be none so that the alarm sound is not notified. In this way, it is possible to cause the operator to recognize the object existing around the dump truck 1 while suppressing the alarm sound from becoming noisy with respect to the operator in the standby state.

In a case where the running mode is the reverse (R), the releasing order, that is, the priority is set in order of the rear side (the sixth alarm region C16), the right rear side (the fourth alarm region C14), the left rear side (the fifth alarm region C15), the right front side (the second alarm region C12), the left front side (the third alarm region C13), and the front side (the first alarm region C11). In this case, since the dump truck 1 is in a state to run backward, the rear side is most important in the position or the direction to be carefully monitored by the operator of the dump truck 1. Further, in the embodiment, since the driver seat 31 is provided at the left side in the dump truck 1, as the position or the direction to be carefully monitored by the operator at the next place, the right rear side in which the operator may not easily see the object becomes important among the left rear side and the right rear side. Hereinafter, the releasing order, that is, the priority is set in order of the left rear side, the right front side, the left front side, and the front side. If the driver seat 31 is provided at the right side, the left rear side becomes important in the position or the direction to be carefully monitored by the operator at the next place of the rear side. Hereinafter, the releasing order, that is, the priority in a case where the driver seat 31 is provided at the right side is set in order of the right rear side, the left front side, the right front side, and the front side if the driver seat 31 is provided at the right side. The alarm sound level is the high (H) at the rear side, the right rear side, and the left rear side, and is the middle (M) at the right front side, the left front side, and the front side. Since the alarm sound level at the rear side of the dump truck 1 is set to be higher than that of the front side, it is possible to cause the operator to further reliably recognize the existence of the object at the rear side which is important before the dump truck 1 runs backward.

In the embodiment, as described above, the releasing order, that is, the priority is changed in response to the state of the dump truck 1. For this reason, the periphery monitoring system 10 may cause the operator of the dump truck 1 to recognize the object in order of the high importance degree and release the alarm. As a result, since the operator of the dump truck 1 may further reliably recognize the object existing around the dump truck 1, it is possible to further reliably monitor the periphery.

In step S102, the alarm releasing unit 160 acquires a signal (running mode signal) and the like representing the running mode of the dump truck 1 from the shift lever 37, gives the signal to the data table 41, and acquires the corresponding releasing order. In this way, the releasing order is set. In the embodiment, since the releasing order is set in order of the high priority, the releasing order is equal to the priority. For this reason, in step S103, the alarm notifying unit 150 acquires the releasing order set in step S102 from the alarm releasing unit 160. Further, the alarm notifying unit 150 acquires the object position information detected in step S101 from the object position information generating unit 130 of the controller 100. Then, the alarm notifying unit 150 sets the alarm based on the acquired releasing order and the acquired object position information.

In a case where the first alarm is set, for example, the alarm notifying unit 150 determines the alarm region with the object in the first alarm region C11 to the sixth alarm region C16 by the acquired object position information. Next, the alarm notifying unit 150 generates a signal for highlighting the periphery of the alarm region with the object and determines a procedure in which the alarm region with the object blinks based on the acquired releasing order. In this way, the first alarm is set. Next, an example of setting the second alarm will be described.

FIG. 14 is a diagram illustrating an example of a data table 42 in which the alarm sound level of each alarm region is described for each running mode of the dump truck 1. As described above, FIG. 13 illustrates the releasing orders, that is, the priorities of the first alarm and the second alarm set for each running mode. However, FIG. 14 illustrates a relation between the alarm sound level and each alarm region as a list. Accordingly, it does not mean that the contents of the data tables of FIGS. 13 and 14 are substantially different from each other. The data table 42 illustrated in FIG. 14 is stored in, for example, a storage unit (not illustrated) including a memory provided in the controller 100 illustrated in FIG. 1. In a case where the second alarm is set, for example, the alarm notifying unit 150 acquires the running mode signal from the shift lever 37, gives the signal to the data table 42, and acquires the alarm sound level corresponding to each alarm region. The alarm notifying unit 150 allocates the alarm sound level which is selected and acquired from the data table 42 to the alarm region with the object in the first alarm region C11 to the sixth alarm region C16. In this way, the second alarm is set. In a case where the alarm notifying unit 150 notifies the second alarm with respect to the alarm region with the object, the alarm sound is generated from the sound generating device 52 at the set alarm sound level.

When the alarm notifying unit 150 sets the alarm, the controller 100 causes the process to proceed to step S104. In step S104, the controller 100, that is, the alarm releasing unit 160 sets the input number n as zero. The input number n indicates the number of times in which the alarm notifying unit 150 receives the alarm releasing signal from the alarm releasing switch 53 illustrated in FIG. 3. Next, the controller 100 causes the process to proceed to step S105. In the description below, the running mode of the dump truck 1 is set as the forward (F) in principle. Accordingly, the releasing order is set in order of the front side, the right front side, the left front side, the right rear side, the left rear side, and the rear side.

FIGS. 15 to 18 are diagrams illustrating an example of a screen on which the alarm is displayed. In step S105, the controller 100, that is, the alarm notifying unit 150 notifies the alarm. In the embodiment, since both the first alarm and the second alarm are notified as the alarm, the alarm notifying unit 150 notifies the first alarm and the second alarm set in step S103. In this example, it is assumed that each of the first region 11C, the fourth region 14C, and the sixth region 16C illustrated in FIG. 5 detects one object and three objects are detected in total. For this reason, the display control unit 140 acquires the bird's eye image information from the bird's eye image synthesizing unit 110 and acquires the object position information from the object position information generating unit 130. Then, the display control unit 140 displays the mark MKa in the first alarm region C11, displays the mark MKb in the fourth alarm region C14, and displays the mark MKc in the sixth alarm region C16 in the first image 202A displayed on the monitor 50 illustrated in FIG. 15 so as to correspond to the object detected based on the acquired bird's eye image information and the acquired object position information.

When notifying the first alarm, the alarm notifying unit 150 displays the region with the marks MKa, MKb, and MKc in the first image 202A in a manner different from the region without the marks MKa, MKb, and MKc. Specifically, the alarm notifying unit 150 highlights the boundary line OL1 of the first alarm region C11 with the mark MKa, the boundary line OL4 of the fourth alarm region C14 with the mark MKb, and the boundary line OL6 of the sixth alarm region C16 with the mark MKc. For example, as described above, the boundary lines OL1, OL4, and OL6 are displayed as a red line so as to highlight the boundary lines. At this time, the alarm notifying unit 150 does not highlight the boundary lines OL2, OL3, and OL5 of the second alarm region C12, the third alarm region C13, and the fifth alarm region C15. Further, the alarm notifying unit 150 causes the periphery of the alarm region which is released first to blink based on the releasing order set in step S102 by the alarm releasing unit 160. In this example, since the releasing order is the high order (in this example, the first place) and the alarm region in which the alarm is first released is the first alarm region C11, the boundary line OL1 of the first alarm region C11 blinks. In this way, in the embodiment, the alarm notifying unit 150 notifies the alarm of the alarm region with the higher releasing order in a manner different from the alarm region with the lower releasing order. That is, the alarm notifying unit 150 differentiates the first alarm notification mode in response to the releasing order. In this way, the periphery monitoring system 10 may cause the operator of the dump truck 1 to first check the alarm region with the higher priority. Further, the periphery monitoring system 10 may cause the operator to visually recognize the alarm region which needs the periphery monitoring the most in a case where a plurality of objects exist in different alarm regions.

When notifying the second alarm, the alarm notifying unit 150 generates the alarm sound from the sound generating device 52 at the alarm sound level corresponding to the alarm region which is released first based on the alarm sound level allocated to each alarm region in step S103. In this example, since the alarm region in which the alarm is released first is the first alarm region C11, the alarm notifying unit 150 generates the alarm sound from the sound generating device 52 at the alarm level corresponding to the first alarm region C11. In the embodiment, the releasing order is changed in response to the state of the dump truck 1, that is, the running mode, and hence the alarm sound level of each alarm region is also changed. As illustrated in the data table 41 of FIG. 13, the alarm sound level of the first alarm region C11 is the high (H) when the running mode of the dump truck 1 is the forward (F) and the alarm sound level of the first alarm region C11 is the middle (M) when the running mode is the neutral (N). Further, the alarm sound level of the first alarm region C11 is none (NA) when the running mode is the stop (P) and the alarm sound level of the first alarm region C11 is the middle (M) when the running mode is the reverse (R).

Further, as illustrated in the data table 41 of FIG. 13, when the running mode of the dump truck 1 is the forward (F), the alarm sound level between the third and fourth releasing orders is changed from the high (H) to the middle (M). Further, when the running mode of the dump truck 1 is the neutral (N), the alarm sound level between the second and third releasing orders is changed from the middle (M) to the low (L). In this way, in the embodiment, the alarm notifying unit 150 differentiates the second alarm notification mode by differentiating the alarm sound level in response to the releasing order. Since the releasing order is equal to the priority, when the configuration is set as described above, the alarm sound level may be increased when the priority is high, and hence the operator of the dump truck 1 may reliably recognize the existence of the object. Furthermore, in the embodiment, the priority of the second alarm decreases in order of the high (H), the middle (M), and the low (L) of the alarm sound level. The releasing order of the second alarm is set in order of the high (H), the middle (M), and the low (L) of the alarm sound level. Next, an image displayed on the screen of the monitor 50 will be described.

(Image Displayed on Monitor)

In the embodiment, in the monitor 50, the first image 202A, the second image 202B, and the third image 202C are displayed on the same screen. In order to notify the alarm, at least one of the first image 202A, the second image 202B, and the third image 202C may be displayed on the monitor 50. In the first image 202A, the dotted lines RL1, RL2, and RL3 are displayed around the dump truck 1. The dotted line RL1 is displayed at a position closest to the dump truck 1, and the dotted line RL3 is displayed at a position farthest from the dump truck 1. The dotted line RL2 is displayed between the dotted line RL1 and the dotted line RL3. Each of the dotted lines RL1, RL2, and RL3 indicates a position away from the dump truck 1 by a predetermined distance. The operator of the dump truck 1 may recognize the distance between the dump truck 1 and each of the marks MKa, MKb, and MKc displayed on the first image 202A by the dotted lines RL1, RL2, and RL3.

The second image 202B is an image which is captured by at least one of the plurality of image capturing devices 11 to 16. Since the periphery monitoring system 10 displays the images captured by the image capturing devices 11 to 16 on the monitor 50 as the second image 202B, the operator of the dump truck 1 may see the peripheral environment of the dump truck 1. In the embodiment, the display control unit 140 displays an image, corresponding to the position in which the alarm releasing unit 160 first releases the alarm in the images captured by the plurality of image capturing devices 11 to 16, as the second image 202B on the monitor 50 before the alarm releasing switch 53 receives an input for releasing the alarm from the operator. In the example illustrated in FIG. 15, the position in which the alarm releasing unit 160 first releases the alarm is the first alarm region C11 with the object. Accordingly, the second image 202B becomes an image corresponding to the first alarm region C11, that is, an image of the first region 11C illustrated in FIG. 5 among the images captured by the plurality of image capturing devices 11 to 16. In the example illustrated in FIG. 15, a vehicle 80 is displayed as the object corresponding to the mark MKa. If the object (the mark MKa) does not exist in front of the dump truck 1 and the existing objects are the mark MKb and the mark MKc, the second image 2B becomes an image corresponding to the alarm region with the higher releasing order, that is, an image of the fourth region 14C illustrated in FIG. 5. Furthermore, the state before the alarm releasing switch 53 receives the input for releasing the alarm from the operator indicates the state before the alarm releasing unit 160 receives the input of the alarm releasing signal from the alarm releasing switch 53 in the process routine of the alarm releasing control which is performed once.

The third image 202C simply depicts the dump truck 1 and the first alarm region C11 to the sixth alarm region C16. The third image 202C indicates at least one of the position of the alarm region as the subject of the alarm and the position of the alarm region displayed by the second image 202B. With such an image structure, the third image 202C has a function of illustrating a relation between the first image 202A and the second image 202B. The position of the alarm region as the subject of the alarm is a region with the marks MKa, MKb, and MKc. In this example, the region includes the first alarm region C11, the fourth alarm region C14, and the sixth alarm region C16. In the example illustrated in FIG. 15, the regions are indicated by a mesh shape or a hatching. In the example illustrated in FIG. 15, the positions of the second alarm region C12, the third alarm region C13, and the fifth alarm region C15 are indicated colorlessly or indicated by a monotone. As this example, the position of the alarm region which is displayed by the second image 202B is the first alarm region C11. In the example illustrated in FIG. 15, the region is indicated by a mesh shape. In this way, the third image 202C displays the position of the alarm region (in the example of FIG. 15, the second alarm region C12, the third alarm region C13, and the fifth alarm region C15) which is not the subject of the alarm and the position of the alarm region (in the example of FIG. 15, the first alarm region, the fourth alarm region C14, and the sixth alarm region C16) which is the subject of the alarm in a different manner. Further, among these, the shape (in this example, a mesh shape) indicating the position of the alarm region (in the example of FIG. 15, the first alarm region C11) in which the images captured by the image capturing devices 11 to 16 are displayed as the second image 202B is different from the shape (in this example, a hatching) indicating the position of the alarm region (in the example of FIG. 15, the fourth alarm region C14 and the sixth alarm region C16) in which the subject of the other alarm is displayed. The operator of the dump truck 1 may intuitively recognize the alarm region displayed as the second image 202B and the region with the object by seeing the third image 202C displayed on the monitor 50. For this reason, the operator may further reliably and accurately recognize the positional relation between the dump truck 1 and the object.

In step S105, when the alarm notifying unit 150 notifies the alarm, the controller 100 causes the process to proceed to step S106. In step S106, when the controller 100 illustrated in FIG. 3, that is, the alarm releasing unit 160 receives the alarm releasing signal from the alarm releasing switch 53 (Yes in step S106), the controller 100 causes the process to proceed to step S107. When the alarm releasing signal is not input from the alarm releasing switch 53 (No in step S106), the controller 100 returns the process to step S105. In step S105, the alarm notifying unit 150 keeps notifying the alarm. The alarm releasing signal is generated by the alarm releasing switch 53 when the operator of the dump truck 1 operates the alarm releasing switch 53.

Figure 16:
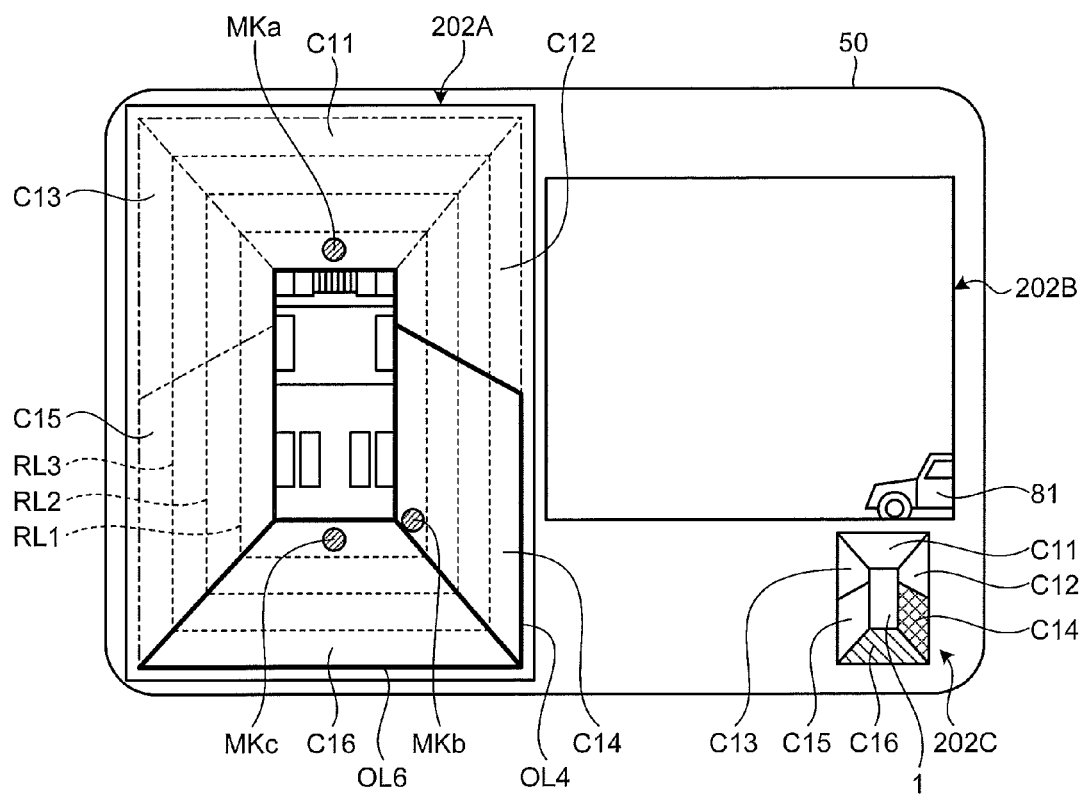
FIG. 16 is a diagram illustrating an example of a screen on which an alarm is displayed.

In step S107, the alarm releasing unit 160 releases the alarm. Specifically, the alarm releasing unit 160 releases the alarm in accordance with the releasing order set in step S102. Since the releasing order in this example is set in order of the front side, the right front side, the left front side, the right rear side, the left rear side, and the rear side, the alarm releasing unit 160 first releases the alarm of the first alarm region C11. As illustrated in FIG. 16, the first alarm is released in a manner such that the blinking of the boundary line OL1 of the first alarm region C11 in the first image 202A is stopped and the highlighting of the boundary line OL1 is stopped. That is, the first alarm is released in a manner such that the region, that is, the first alarm region C11 with the mark MKa in the first image 202A is displayed in the same manner as that of the region without the other mark including the mark MKa. The second alarm is released in a manner such that the alarm sound of the first alarm region C11 is stopped. The second alarm may be released by changing the sound, for example, by changing the alarm sound level. In the embodiment, the first alarm and the second alarm are released at the same time in accordance with the releasing order which is set in advance based on the alarm releasing signal when at least one object is detected. Furthermore, as illustrated in FIG. 14, the second alarm includes the alarm regions of the same alarm sound level. For this reason, when the first alarm and the second alarm are released through the alarm regions of the same alarm sound level, the first alarm is released and the display of the monitor 50 is changed. However, there is a case in which the alarm sound level is not changed even when the second alarm is released.

As described above, the periphery monitoring system 10 does not release the alarm when the operator of the dump truck 1 does not operate the alarm releasing switch 53. For this reason, the periphery monitoring system 10 may cause the operator to further reliably recognize the subject as the object existing around the dump truck 1 when assisting the driving operation of the operator using the bird's eye image 200.

The alarm notifying unit 150 keeps displaying the mark MKa existing in the first alarm region C11 as illustrated in FIG. 16 as long as the object exists in place where the object may be detected by the radar devices 21 to 28 even after the alarm releasing unit 160 releases the alarm of the first alarm region C11. In this way, it is possible to cause the operator of the dump truck 1 to recognize the existence of the object around the dump truck 1 even after the alarm is released. Furthermore, when the object does not exist in the first region 11C corresponding to the first alarm region C11, the alarm notifying unit 150 does not display the mark MKa in the first alarm region C11.

When the alarm of the first alarm region C11 is released, the controller 100 causes the process to proceed to step S108. In step S108, the controller 100, that is, the alarm notifying unit 150 changes the alarm notification mode with respect to the alarm region corresponding to the next releasing order and displays the alarm region in a manner different from the other alarm region. In this example, the alarm region of which the alarm is released after the first alarm region C11 is the fourth alarm region C14. For this reason, as illustrated in FIG. 16, the alarm notifying unit 150 notifies the first alarm in a manner such that the boundary lines OL4 and OL6 of the periphery of the fourth alarm region C14 and the sixth alarm region C16 are highlighted and the boundary line OL4 of the fourth alarm region C14 blinks. At this time, the alarm notifying unit 150 highlights the boundary line OL6 of the sixth alarm region C16 without any blinking. Further, the alarm notifying unit 150 notifies the second alarm in a manner such that the sound generating device 52 generates the alarm sound at the alarm sound level corresponding to the fourth alarm region C14. In this example, the alarm sound level corresponding to the fourth alarm region C14 is the middle (M). Since the releasing order is equal to the priority and the periphery monitoring system 10 changes the alarm notification mode with respect to the alarm region corresponding to the next releasing order, it is possible to cause the operator to further reliably recognize the alarm region to be carefully monitored by the operator of the dump truck 1 at the next time.

When the alarm notification mode with respect to the alarm region corresponding to the next releasing order is changed, the controller 100 causes the process to proceed to step S109. In step S109, the controller 100, that is, the display control unit 140 displays an image corresponding to a position in which the alarm is released at the next time as the second image 202B on the monitor 50. After the alarm releasing switch 53 receives an input for releasing the alarm from the operator of the dump truck 1 and the alarm releasing unit 160 releases the alarm by this process, an image corresponding to the position in which the alarm is released at the next time is displayed as the second image 202B on the monitor 50. The state after the alarm releasing switch 53 receives the input for releasing the alarm from the operator is the state after the alarm releasing unit 160 receives an input of the alarm releasing signal from the alarm releasing switch 53 in the routine of the alarm releasing control process performed once.

In this example, the position in which the alarm is released at the next time is the fourth alarm region C14. Accordingly, the second image 202B becomes an image corresponding to the fourth alarm region C14, that is, an image of the fourth region 14C illustrated in FIG. 5 among the images captured by the plurality of image capturing devices 11 to 16 (step S109). FIG. 16 illustrates a screen of the monitor 50 after the alarm of the first alarm region C11 is released, but an image capturing the fourth region 14C corresponding to the fourth alarm region C14 is displayed in the second image 202B. A part of a vehicle 81 as the object corresponding to the mark MKb is displayed in the second image 202B.

In the embodiment, when the alarm notification mode with respect to the alarm region corresponding to the next releasing order is changed, as illustrated in FIG. 16, the display control unit 140 displays the position as the subject of the alarm, that is, the fourth alarm region C14 and the sixth alarm region C16 in this example in the third image 202C (in this example, the alarm regions are indicated by a mesh shape or a hatching). Since the first alarm region C11 of which the alarm is released does not correspond to the subject of the alarm any more, the alarm region is not displayed in the third image 202C (in this example, the first alarm region C11 is indicated colorlessly or indicated by a monotone). The display control unit 140 displays the fourth alarm region C14 in which the images captured by the image capturing devices 11 to 16 are displayed as the second image 202B in the third image 202C in a manner different from the sixth alarm region C16 (in FIG. 16, a mesh). In this way, the operator of the dump truck 1 may institutively recognize the alarm region displayed as the second image 202B by seeing the third image 202C displayed on the monitor 50. In a case where the third image 202C is not displayed, the above-described process with respect to the third image 202C is not executed.

When the second image 202B is switched, in step S110, the controller 100, that is, the alarm releasing unit 160 sets a value in which one is added to the input number n as a new input number n. Next, the routine proceeds to step S111, and the controller 100, that is, the alarm releasing unit 160 compares the input number n with the alarm number N. The alarm number N is the number of regions with the objects in the first region 11C to the sixth region 16C and is the number of alarm regions in which the marks MKa, MKb, and MKc are displayed. In this example, N is 3.

Figure 17:
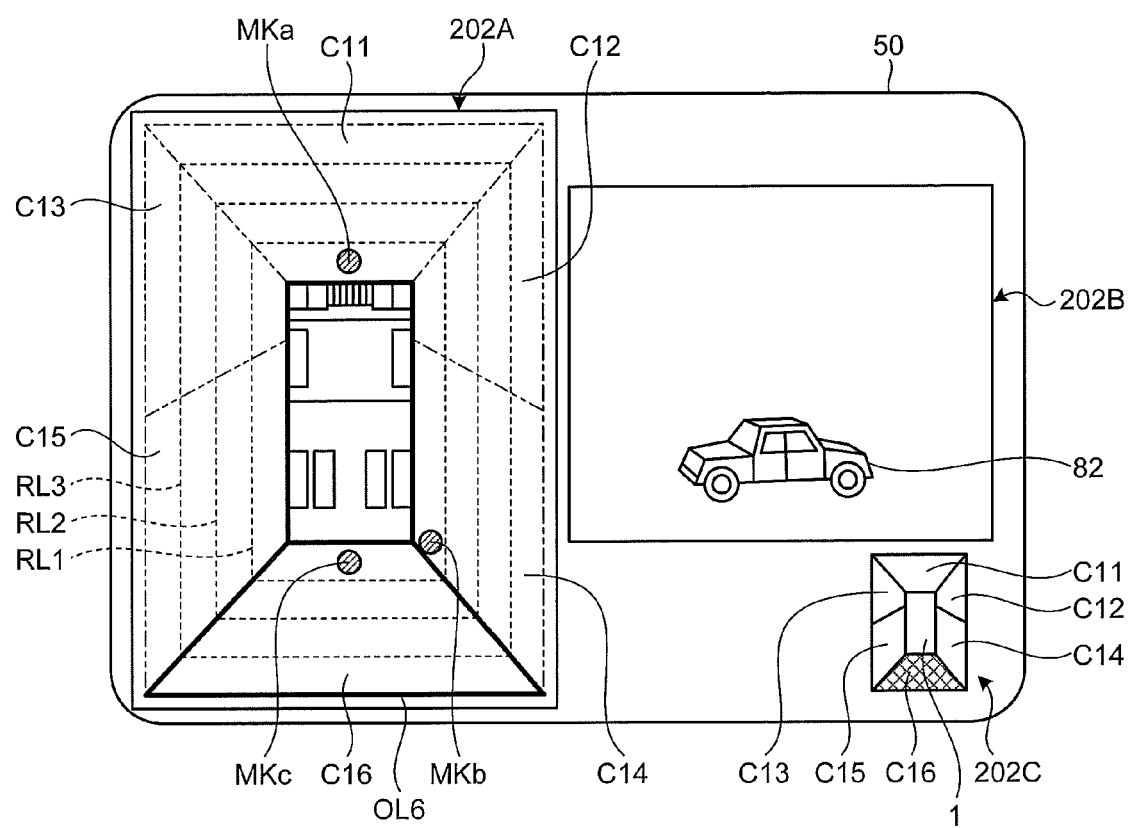
FIG. 17 is a diagram illustrating an example of a screen on which an alarm is displayed.

In step S111, when n is not equal to N (a relation in which the value of n is not equal to the value of N) (No in step S111), the controller 100 repeats the processes from step S106 to step S110 until n is equal to N (a relation in which the value of n is equal to the value of N). In this example, when the operator of the dump truck 1 operates the alarm releasing switch 53 so as to release the alarm of the fourth alarm region C14, a second alarm releasing signal is input from the alarm releasing switch 53 to the alarm releasing unit 160 (Yes in step S106). Then, when the controller 100 executes the process in step S107, the alarm of the fourth alarm region C14 of which the alarm is released after the first alarm region C11 as the next releasing order is released. As a result, as illustrated in FIG. 17, the monitor 50 displays the first image 202A of which the blinking and the highlighting of the fourth alarm region C14 are stopped. As long as the object (in this example, the marks MKa and MKb) exists in a place where the object may be detected by the radar devices 21 to 28, the marks MKa and MKb are continuously displayed in the first image 202A.

When the controller 100 executes the process in step S108, the alarm notification mode of the sixth alarm region C16 of which the alarm is released after the fourth alarm region C14 as the next releasing order is changed. Specifically, as illustrated in FIG. 17, the boundary line OL6 of the sixth alarm region C16 is highlighted as a specific color (in this example, red) and blinks. Further, when the controller 100 executes the process in step S109, as illustrated in FIG. 17, the display of the second image 202B may be switched to the image capturing the sixth region 16C corresponding to the sixth alarm region C16. In this example, as the object corresponding to the mark MKc displayed in the sixth alarm region C16 of the first image 202A, a vehicle 82 existing in the sixth region 16C at the rear side of the dump truck 1 is displayed in the second image 202B. Further, as illustrated in FIG. 17, the position as the subject of the alarm, that is, the sixth alarm region C16 in this example is displayed in the third image 202C (in this example, the sixth alarm region C16 is indicated by a mesh shape). In the sixth alarm region C16, the images captured by the image capturing devices 11 to 16 correspond to the position displayed as the second image 202B.

Next, in step S110, the alarm releasing unit 160 sets a value in which one is added to the input number n as a new input number n. In this example, n is two (a relation in which the value of n is equal to two). Next, the routine proceeds to step S111, and the alarm releasing unit 160 compares the input number n with the alarm number N. Since n is equal to two, n is not equal to N (a relation in which the value of n is not equal to the value of N) (No in step S111). Accordingly, the controller 100 executes the processes from step S106 to step S110.

Figure 18:
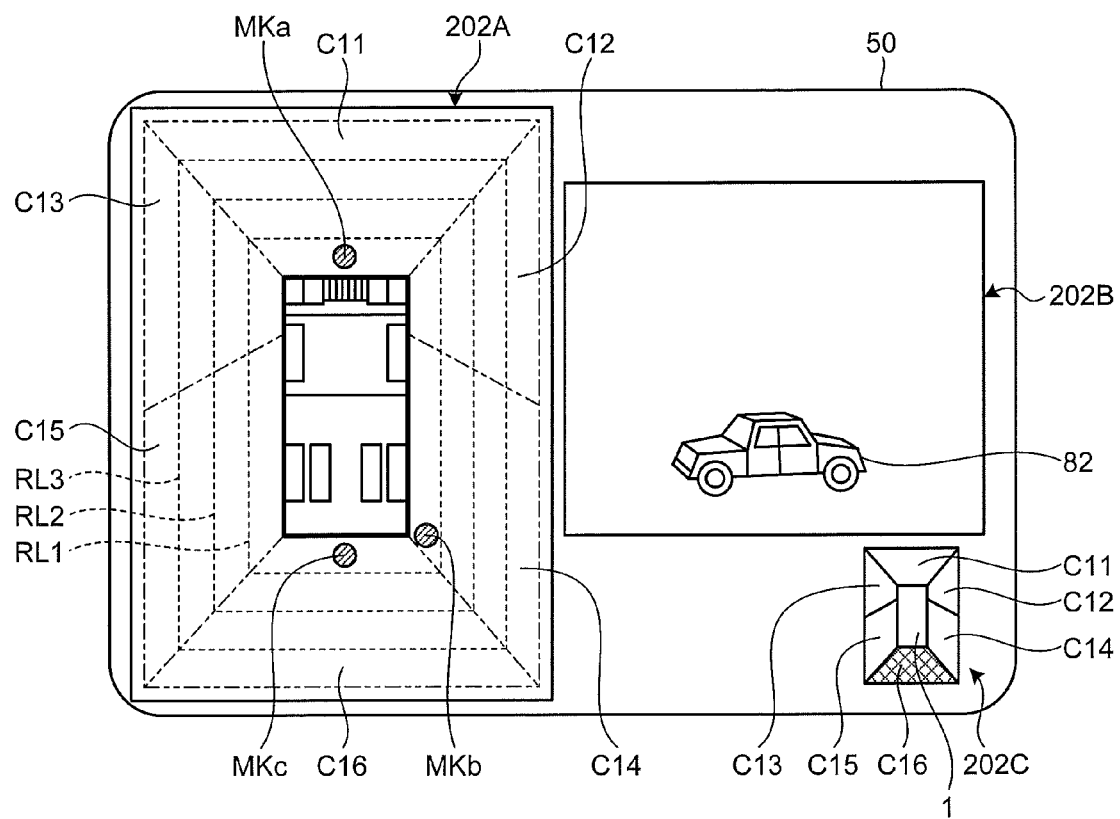
FIG. 18 is a diagram illustrating an example of a screen on which an alarm is displayed.

When the third alarm releasing signal is input from the alarm releasing switch 53 to the alarm releasing unit 160 (Yes in step S106), the controller 100 executes the process in step S107, so that the alarm of the sixth alarm region C16 of which the alarm is released after the fourth alarm region C14 as the next releasing order is released. As a result, as illustrated in FIG. 18, the monitor 50 displays the first image 202A of which the blinking and the highlighting of the sixth alarm region C16 are stopped. As long as the object (in this example, the marks MKa, MKb, and MKc) exists in a place where the object may be detected by the radar devices 21 to 28, the marks MKa, MKb, and MKc are continuously displayed in the first image 202A.

When the controller 100 executes the process in step S108, the alarm notification mode of the sixth alarm region C16 corresponding to the next releasing order is changed. However, in this example, since the alarm of the sixth alarm region C16 corresponding to the final releasing order is released, step S108 is skipped. Further, when the controller 100 executes the process in step S109, the display of the second image 202B may be switched to the image corresponding to the position in which the alarm is released at the next time in the images captured by at least one of the image capturing devices 11 to 16. However, in this example, the alarm of the sixth alarm region C16 as the lowest releasing order is released. For this reason, since there is no alarm region of which the alarm is released at the next time, the second image 202B is not switched to the captured image corresponding to the alarm region of which the alarm is released at the next time. In this case, for example, as illustrated in FIG. 18, the second image 202B is maintained as the most recent image. That is, the image of the sixth region C16 corresponding to the sixth alarm region C16 and captured by at least one of the image capturing devices 11 to 16 is displayed as the second image 202B. When there is no alarm region of which the alarm is released at the next time, as illustrated in FIG. 18, the third image 202C displays the position of the alarm region displayed as the second image 202B around the dump truck 1.

Further, when there is no alarm region of which the alarm is released at the next time, the display control unit 140 may display any one of the images showing the object existing around the dump truck 1 and captured by at least one of the image capturing devices 11 to 16 as the second image 202B. In this case, the display control unit 140 may display the image showing the object existing in the position or the direction corresponding to the alarm region with the highest priority as the second image 202B on the monitor 50. In this example, since the priority is equal to the releasing order, the image showing the object in the position or the direction corresponding to the alarm region, that is, the first alarm region C11 with the first releasing order is displayed as the second image 202B on the monitor 50.

Further, when there is no alarm region of which the alarm is released at the next time, the display control unit 140 may display any one of the images showing the object existing around the dump truck 1 based on the state of the dump truck 1 as the second image 202B. For example, when the running mode of the dump truck 1 is the forward (F), the display control unit 140 displays the region with the object among the first region 11C, the second region 12C, and the third region 13C as the front side of the dump truck 1 as the second image 202B in response to the priority (that is, the releasing order). Further, when the running mode of the dump truck 1 is the reverse (R), the display control unit 140 displays the region with the object among the sixth region 16C, the fourth region 14C, and the fifth region 15C as the rear side of the dump truck 1 as the second image 202B in response to the priority (that is, the releasing order).

Further, there is a case in which the object moves away from the dump truck 1 while the alarm is released and the mark MK displayed in the first image 202A is not displayed. In this case, the display control unit 140 may display the image showing the object existing in the position or the direction corresponding to the alarm region with the first releasing order in the alarm region of the first image 202A with the mark MK as the second image 202B on the monitor 50 after releasing the alarm of the alarm region with the lowest releasing order.

Next, in step S110, the alarm releasing unit 160 sets a value in which one is added to the input number n as a new input number n. In this example, n is equal to three (a relation in which the value of n is equal to three). Next, the routine proceeds to step S111, and the alarm releasing unit 160 compares the input number n with the alarm number N. Since n is equal to three, n is equal to N (a relation in which the value of n is equal to the value of N) (Yes in step S111). In this case, since all alarms are released, the controller 100 ends the alarm releasing control according to the embodiment. Next, a case will be described in which the object around the dump truck 1 moves and the mark MK corresponding to the object in the first image 202A moves.

<Mark Moving Case>

Figure 19:
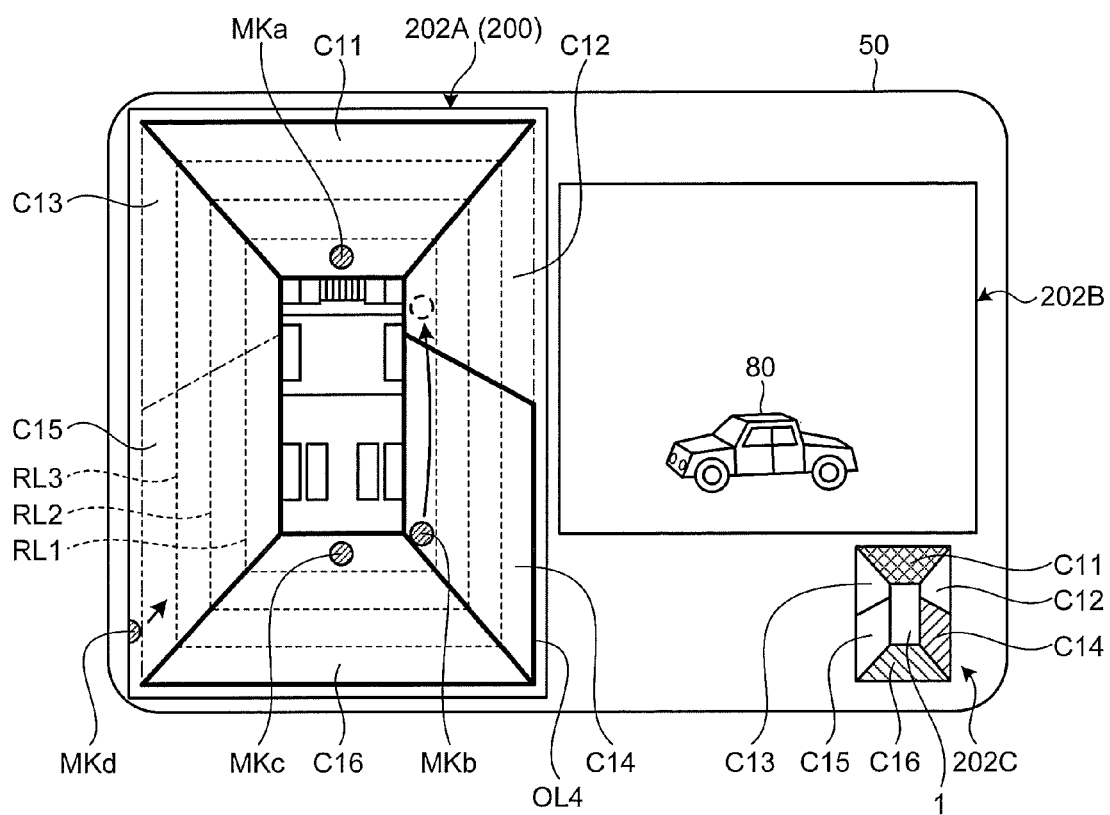
FIG. 19 is a diagram illustrating a case where marks MKb and MKd move.
Figure 20:
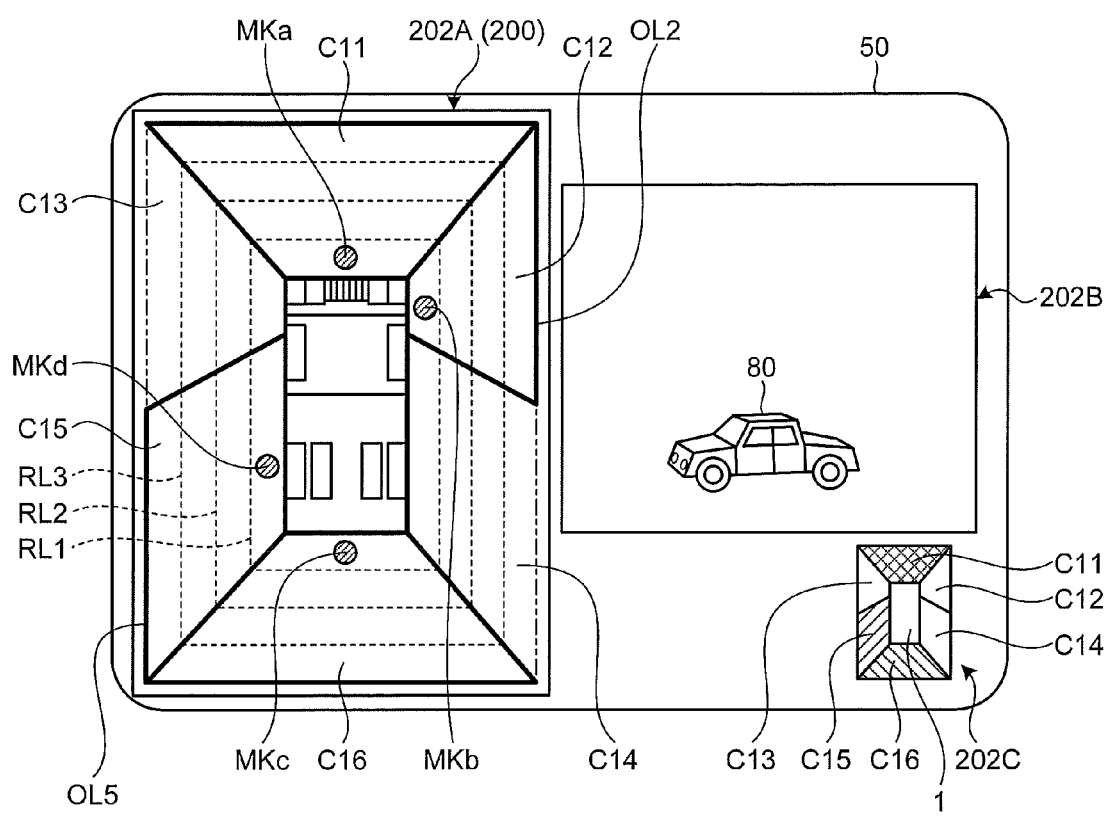
FIG. 20 is a diagram illustrating a case where the marks MKb and MKd move.

FIGS. 19 and 20 are diagrams illustrating a case where the marks MKb and MKd move. For example, there is a case in which the mark MKb existing in the fourth alarm region C14 of the first image 202A moves. Further, there is a case in which a new object approaches the dump truck 1 and a new mark MKd is displayed in the alarm region (in the examples illustrated in FIGS. 19 and 20, the fifth alarm region C15) of the first image 202A. In such a case, the controller 100, that is, the display control unit 140 notifies at least the first alarm with respect to the alarm region with the marks MKb and MKd. Furthermore, the arrows illustrated in the first image 2A of FIG. 19 indicate the movement of the mark MKb or the mark MKd for convenience of the description, and the arrows are not displayed in the first image 2A.

When the controller 100, that is, the object position information generating unit 130 illustrated in FIG. 3 detects the movement of the object corresponding to the mark MKb existing in the fourth alarm region C14 through the radar devices 21 to 28, the controller 100, that is, the display control unit 140 displays the mark MKb in the first image 202A including the bird's eye image 200 in a moving state in response to the movement of the object as illustrated in FIGS. 19 and 20. As illustrated in FIG. 20, when the mark MKb enters the other alarm region beyond the fourth alarm region C14 in which the mark exists at first, the controller 100, that is, the alarm notifying unit 150 notifies at least the first alarm. Since the first alarm displays the region with the mark MKb in a manner different from the region without the other mark, for example, the alarm notifying unit 150 highlights the boundary line OL2 of the second alarm region C12 in red or the like. In the example illustrated in FIG. 20, if the mark MKb moves to the second alarm region C12, the other mark does not exist in the fourth alarm region C14 in which the mark MKb exists at first. For this reason, the alarm notifying unit 150 stops the highlighting of the boundary line OL4 of the fourth alarm region C14.

The second image 202B is an image corresponding to the position of the first releasing order, that is, the position in which the alarm is released first among the images captured by the plurality of image capturing devices 11 to 16. When the running mode of the dump truck 1 is the forward (F), the alarm region corresponding to the position of the first releasing order is the first alarm region C11 as illustrated in the data table 41 of FIG. 13. Accordingly, in the example illustrated in FIG. 20, the display control unit 140 displays the image of the first region 11C corresponding to the first alarm region C11 as the second image 202B on the monitor 50 even after the mark MKb moves to the second alarm region C12. When the display of at least one of the first image 202A and the second image 202B is changed by the movement of the mark MKb, the display of the third image 202C is changed with the change.

When the releasing order is changed as a result in which the mark MKb corresponding to the object moves from the alarm region where the mark exists at first to the other alarm region, the second image 202B is displayed according to the changed releasing order. For example, a case will be considered in which the running mode of the dump truck 1 is the forward (F) and the object exists only in the fourth region 14C and the sixth region 16C. In this case, as illustrated in the data table 41, of FIG. 13, since the alarm region corresponding to the position of the first releasing order is the fourth alarm region C14, the image of the fourth region 14C corresponding to the fourth alarm region C14 is displayed as the second image 202B on the monitor 50. When the mark MKb moves to the second alarm region C12 by the movement of the object of the fourth region 14C, as illustrated in the data table 41 of FIG. 13, the alarm region corresponding to the position of the first releasing order becomes the second alarm region C12. Accordingly, the image of the second region 12C corresponding to the second alarm region C12 is displayed as the second image 202B on the monitor 50.

The second alarm is also notified in accordance with the changed releasing order when the releasing order is changed as a result in which the mark MKb corresponding to the object moves from the alarm region where the mark exists at first to the other alarm region. For example, a case will be considered in which the running mode of the dump truck 1 is the forward (F) and the object exists only in the fourth region 14C and the sixth region 16C. In this case, as illustrated in the data table 41 of FIG. 13, since the alarm region corresponding to the position of the first releasing order is the fourth alarm region C14, the alarm sound of which the alarm sound level is the middle (M) is notified as the second alarm. When the mark MKb moves to the second alarm region C12 by the movement of the object of the fourth region 14C, as illustrated in the data table 41 of FIG. 13, the alarm region corresponding to the position of the first releasing order becomes the second alarm region C12. Accordingly, the alarm sound of which the alarm sound level is the high (H) is notified as the second alarm. Next, a case will be described in which a new mark MKd is displayed in the alarm region of the first image 202A.

When the controller 100, that is, the object position information generating unit 130 illustrated in FIG. 3 detects a new object moving toward the dump truck 1 through the radar devices 21 to 28, the controller 100, that is, the display control unit 140 displays the mark MKd in the first image 202A including the bird's eye image 200 in response to the movement of the object as illustrated in FIGS. 19 and 20. The controller 100, that is, the alarm notifying unit 150 notifies at least the first alarm. Since the first alarm displays the region with the mark MKd in a manner different from the region without the other mark, for example, the alarm notifying unit 150 displays the boundary line OL5 of the fifth alarm region C15 with the mark MKd in red or the like.

The second image 202B is an image corresponding to the position of the first releasing order, that is, the position in which the alarm is released at first among the images captured by the plurality of image capturing devices 11 to 16, and is the first alarm region C11 when the running mode of the dump truck 1 is the forward (F). Accordingly, in the example illustrated in FIG. 20, the display control unit 140 displays the image of the first region 11C corresponding to the first alarm region C11 as the second image 202B on the monitor 50 even after the mark MKd exists in the fifth alarm region C15. When the display of at least one of the first image 202A and the second image 202B is changed by the movement of the mark MKd, the display of the third image 202C is changed with the change. When the releasing order is changed as a result in which the mark MKd moves from the alarm region where the mark exists at first to the other alarm region, the second image 202B is displayed and the second alarm is notified in accordance with the changed releasing order. This is the same as the case where the mark MKb moves to the other alarm region.

As described above, when the mark moves from the original alarm region to the other alarm region by the movement of the object or a new mark is displayed in the alarm region due to the entrance of the object, the controller 100 of the periphery monitoring system 10 notifies at least the first alarm. As a result, the periphery monitoring system 10 may cause the operator of the dump truck 1 to reliably recognize the object existing around the dump truck 1.

Furthermore, when the mark moves from the original alarm region to the other alarm region by the movement of the object, the alarm releasing control illustrated in FIG. 9 is executed as described below. In this case, the mark moves while the process in any step is executed after step S101. However, the controller 100 returns the alarm releasing control to step S101 so as to set a new releasing order in response to the detection of the object by the radar devices 21 to 28 (in this case, the detection of the movement of the object).

Meanwhile, when an object enters while there is no object around the dump truck 1, the alarm releasing control illustrated in FIG. 9 is executed from step S101. However, when a new object enters while the object exists in any alarm region, the alarm releasing control illustrated in FIG. 9 is executed as below. In this case, the mark enters while the process of any step after step S101 is executed. However, the controller 100 returns the alarm releasing control process to step S101 so as to set a new releasing order in response to the detection of the object using the radar devices 21 to 28 (in this case, the detection of the entrance of the object).

Further, a case may be also considered in which any one object moves away from the dump truck 1 so that the object does not become the subject of the alarm while the object exists in any alarm region in advance. Even in this case, the alarm releasing control illustrated in FIG. 9 corresponds to the case where the mark moves while the process of any step after step S101 is executed. In such a case, the controller 100 returns the control process of the alarm releasing control to step S101 in response to the detection of the object by the radar devices 21 to 28 (in this case, the case in which the object is not detected) so as to set a new releasing order in response to the detected object.

<Other Control Example>

In the above-described example, the first image 202A, the second image 202B, and the third image 202C are displayed on the same screen of the monitor 50, but the display control unit 140 may display only the second image 202B and the third image 202C on the same screen of the monitor 50 by stopping the display of the first image 202A. For example, an operator operates an operation switch (not illustrated) so as to generate an operation signal and the operation signal is transmitted to the display control unit 140, thereby displaying only the second image 2B and the third image 2C on the monitor 50. Further, when the operator operates the shift lever 37 so as to switch the running mode to the reverse (R), the signal from the sensor 37a detecting the position of the shift lever 37 is transmitted to the display control unit 140, thereby displaying only the second image 2B and the third image 2C on the monitor 50. In such a case, it is desirable that the display control unit 140 display the second image 202B by using the region in which the first image 202A is displayed in the monitor 50. In this way, since the operator of the dump truck 1 may specifically see the object around the dump truck 1 on a large screen, it is easy to recognize the environment around the dump truck 1 and the size and the position of the object. It is desirable to display only the second image 2B and the third image 2C particularly when the dump truck 1 runs forward or backward at a low speed.

When only the second image 202B and the third image 202C are displayed on the same screen of the monitor 50, the alarm notifying unit 150 may notify the first alarm by using the third image 202C. For example, the alarm notifying unit 150 causes the portion of the first releasing order to blink or displays the mark in the portion corresponding to the region with the object. In this way, the function of the first image 202A may be assisted by the third image 202C. Further, the alarm notifying unit 150 may display the mark corresponding to the object in the second image 202B. In this way, the operator of the dump truck 1 may further reliably recognize the object.

Further, in principle, the periphery monitoring system 10 is used to cause the operator to check the peripheral object before the dump truck 1 starts to run, but the display of the monitor 50 described below may be executed while the dump truck 1 runs at a certain running speed. The display control may be executed in a state where the dump truck 1 runs at a certain running speed, that is, a state where the dump truck runs after the operator recognizes that no peripheral object approaches. In this case, for example, when the dump truck 1 runs backward, the display control unit 140 may receive a signal from the sensor 37a detecting the position of the shift lever 37 as described above and display the image at the rear side of the dump truck 1 as the second image 202B on the monitor 50 regardless of the existence of the object among the images captured by the plurality of image capturing devices 11 to 16. Further, when the dump truck 1 runs forward, the display control unit 140 may receive a signal from the sensor 37a detecting the position of the shift lever 37 as described above and display the image of the position in which the range of the dead angle from the driver seat 31 of the dump truck 1 is largest at the front side of the dump truck 1 as the second image 202B on the monitor 50 regardless of the existence of the object among the images captured by the plurality of image capturing devices 11 to 16. In this way, when the dump truck 1 runs backward, it is possible to check the rear side which is the dead angle of the operator and needs to be carefully monitored the most by the second image 202B of the monitor 50. Further, when the dump truck 1 runs forward, the range which is the dead angle of the operator may be checked by the second image 202B of the monitor 50. As a result, it is possible to further reliably monitor the periphery. Furthermore, it is desirable that the periphery monitoring system 10 executes the above-described alarm releasing control when the running speed of the dump truck 1 is low (for example, the threshold value for determining the low speed is 5 km/h) while the dump truck 1 runs.

Furthermore, the periphery-monitoring system 10 may have a configuration in which the alarm releasing unit 160 receives a signal representing the magnitude of the running speed detected by the vehicle speed sensor 54 and the controller 100 executes the alarm releasing control only when the dump truck 1 stops. However, the invention is not limited thereto. It is desirable that the above-described alarm releasing control may be executed even when the running speed of the dump truck 1 is low (for example, the threshold value for determining the low speed is 5 km/h). That is, this is because the convenience in operation is excellent when the alarm releasing control may be executed even though the dump truck 1 is completely stopped by the operator through the brake operation. Meanwhile, when the dump truck 1 runs at a certain running speed (for example, a case where the running speed exceeds the threshold value of 5 km/h for determining the low speed), the power supplied to the radar devices 21 to 28 is interrupted so as not to detect the object, so that the alarm releasing control may not be executed.

Furthermore, as described above, in the embodiment, the second alarm is described as a sound, but a voice may be used instead of the sound. In this case, for example, a voice is stored in advance in the storage unit (not illustrated) of the controller 100. The voice is set as a plurality of kinds as illustrated in FIGS. 12 to 14, and the voice is stored as the data table in response to the running mode and the releasing order. For example, a voice meaning that the "risk degree is a high level" is set for the case where the alarm sound level is the high (H), a voice meaning that the "risk degree is a middle level" is set for the case where the alarm sound level is the middle (M), and a voice meaning that the "risk degree is a low level" is set for the case where the alarm sound level is the low (L). When the voice is used in this way, the operator needs to understand the language of the voice, and hence it is desirable that a setting be provided to select a local language of the construction site where the dump truck 1 is operated or the operator's national language.

As described above, in the embodiment, the periphery monitoring system 10 displays the first image 202A in which the mark indicating the object detected around the dump truck 1 overlaps the bird's eye image and the second image 202B which is captured by the image capturing devices 11 to 16 on the same screen of the monitor 50, and notifies, as the alarm, the first alarm in which the region with the mark in the first image 202A is displayed in a manner different from the other region and the second alarm in which the existence of the object is notified as a sound. Then, the periphery monitoring system 10 releases the alarm in accordance with the releasing order based on the position of the existence of the object based on the alarm releasing signal from the alarm releasing switch 53. In this way, it is possible to cause the operator of the dump truck 1 to reliably recognize the object existing around the dump truck 1 by the alarm. Further, since the operator releases the alarm in accordance with the releasing order with the operation of the alarm releasing switch 53, the operator may reliably and sequentially recognize the object. That is, since the alarm releasing switch 53 is operated after the operator recognizes the existence of the object, it is effective to cause the operator to recognize the object.

In this way, the periphery monitoring system 10 may cause the operator to further reliably recognize the subject as the object existing around the dump truck 1 when assisting the driving operation by the bird's eye image 200 in which the images captured by the plurality of image capturing devices are synthesized. Further, the periphery monitoring system 10 keeps displaying the mark on the monitor 50 as long as the object exists around the dump truck 1 even after the alarm is released. For this reason, the operator may recognize the movement and the appearance of the object existing around the dump truck 1 by checking the monitor 50.

The periphery monitoring system 10 uses the blinking in the first alarm and the sound in the second alarm when notifying the alarm. That is, the periphery monitoring system 10 uses both the vision and the sound. Then, the periphery monitoring system 10 notifies the alarm at a high level when starting notification of the alarm at first and releases both the first alarm and the second alarm when releasing the alarm. However, the mark is continuously displayed. In this way, the periphery monitoring system 10 may cause the operator of the dump truck 1 to reliably recognize the object existing around the dump truck 1 by the alarm in terms of the vision and the sound. Further, since the periphery monitoring system 10 changes the level from the high level to the low level when releasing the alarm, it is possible to cause the operator to recognize the level which needs to be carefully monitored by the object. Further, since the first alarm and the second alarm are released at the same time, it is possible to reduce the possibility that the operator feels troublesome due to the continuous ringing of the alarm sound. Further, since the mark is displayed on the monitor 50 even when the first alarm and the second alarm are released at the same time, it is possible to cause the operator to recognize the existence of the peripheral object.

The periphery monitoring system 10 uses a wide dynamic range camera as the image capturing devices 11 to 16. For this reason, the image capturing devices 11 to 16 may brightly correct the dark portion as the shadow of the dump truck 1 while keeping the level at which the bright portion may be seen. Accordingly, the over-exposure and under-exposure hardly occur in the images which are captured by the image capturing devices 11 to 16, and hence the images may be easily understood as a whole. As a result, the periphery monitoring system 10 with the image capturing devices 11 to 16 may display the bird's eye image 200 in which an object such as a vehicle existing in a region as a shadow of the dump truck 1 is easily visible on the monitor 50. In this way, even in an environment in which a contrast difference in contrast is large when the periphery monitoring system 10 monitors the periphery of the dump truck 1 by using the images captured by the image capturing devices 11 to 16, the periphery monitoring system may display the object around the dump truck 1 in the bird's eye image 200. As a result, the operator of the dump truck 1 may reliably see the object existing in the periphery of the dump truck 1, and particularly, the shadow region regardless of the environment.

In this way, since the periphery monitoring system 10 may generate the bird's eye image 200 which reliably displays the object around the dump truck 1 even in an environment in which a contrast difference in contrast is large, the object existing in the blind angle of the operator may be reliably recognized by the bird's eye image 200. Accordingly, the periphery monitoring system 10 may be very effectively used to monitor the periphery of the above-described superjumbo dump truck 1 used in a mine. That is, there is a case in which the dump truck 1 forms a very large shadow region. Further, there is a case in which the dump truck moves while forming its shadow region and the shadow region largely changes by the elevation of the vessel 4. Further, there is a case in which the dead angle region is large. In such a dump truck 1, the periphery monitoring system 10 may provide the accurate information around the dump truck 1 for the operator of the dump truck 1 by generating the bird's eye image 200 reliably displaying the object around the dump truck 1. Further, the periphery monitoring system 10 may provide the accurate information around the dump truck 1 for the operator of the dump truck 1 with respect to the dump truck 1 which is operated in a place having a very large illumination difference between a sunny place and a shadow place like an equatorial region.

While the embodiment has been described, the embodiment is not limited to the above-described content. Further, the constituents that are described above include a constituent that is easily supposed by the person skilled in the art, a constituent that has substantially the same configuration, and a constituent that is included in a so-called equivalent scope. Further, the above-described constituents may be appropriately combined with each other. Furthermore, the constituents may be omitted, replaced, or modified in various forms in the scope without departing from the spirit of the embodiment.

REFERENCE SIGNS LIST

1 Dump truck
2 Vehicle body portion
2a Lower deck
2b Upper deck
2f Frame
2c, 2d Ladder
3 Cab
3a Support column
4 Vessel
4F Flange portion
5 Front wheel
6 Rear wheel
10 Periphery monitoring system (work vehicle periphery monitoring system)
11 to 16 Image capturing device
21 to 28 Radar device
31 Driver seat
32 Steering
33 Dash cover
34 Wireless device
35 Radio receiver
36 Retarder
37 Shift lever
37a Sensor
38 Trainer seat
40, 41, 42 Data table
50 Monitor
51 Control panel
52 Sound generating device
53 Alarm releasing switch (alarm releasing instruction unit)
54 Vehicle speed sensor
100 Controller
110 Bird's eye image synthesizing unit
120 Camera image switching/viewing point changing unit
130 Object position information generating unit
140 Display control unit
150 Alarm notifying unit
160 Alarm releasing unit
200 Bird's eye image
202A First image
202B Second image
202C Third image
210 Object information collecting unit
220 Object processing unit
MKa, MKb, MKc, MKd Mark
N Alarm number
n Input number

The invention claimed is:

1. A work vehicle periphery monitoring system comprising:
a plurality of image capturing devices each of which is attached to a work vehicle and captures a periphery of the work vehicle to output an image information item;
a plurality of object detecting devices each of which is attached to the work vehicle to detect an object existing around the work vehicle;
a bird's eye image synthesizing device that acquires the plurality of image information items and synthesizes the acquired image information items to generate a bird's eye image information item for displaying a bird's eye image of the work vehicle and the periphery of the work vehicle on a display device;
a display control device that displays a first image in which a mark representing the object detected by the object detecting device overlaps the bird's eye image based on the bird's eye image information item on a screen of the display device;
an alarm notifying device that notifies, as an alarm, at least one or both of a first alarm of displaying a region with the mark in a manner different from a region without the mark in the first image and a second alarm of notifying an existence of the object by a sound;
an alarm releasing instruction device that receives an input for releasing the alarm; and
an alarm releasing device that releases the alarm in accordance with a releasing order which is prioritized and predetermined regarding relations between a plurality of regions around the work vehicle and a plurality of running modes of the work vehicle based on an alarm releasing signal from the alarm releasing instruction device,
wherein in a case in which: a highest priority is put on a first alarm region; alarm sound in the first alarm region is set as high level; the alarm sound in the first alarm region is notified as the second alarm; and an operator operates the alarm releasing device, the second alarm is released, the first alarm may be also released along with a release of the second alarm, and the second alarm corresponding to an existence of the mark in the first alarm region is first released.

2. The work vehicle periphery monitoring system according to claim 1, wherein in order to release the alarm, the alarm releasing device displays the region with the mark in a same manner as the region without the mark in the first image to release the first alarm and changes or stops the sound to release the second alarm.

3. The work vehicle periphery monitoring system according to claim 1, wherein the alarm notifying device changes a notification mode of the alarm to correspond to the releasing order.

4. The work vehicle periphery monitoring system according to claim 1, wherein the display control device keeps displaying the mark even after the alarm releasing device releases the alarm.

5. The work vehicle periphery monitoring system according to claim 1, wherein when the object detecting device detects a movement of the object, the display control device moves the mark in the bird's eye image in accordance with the movement of the object and the alarm notifying device notifies at least the first alarm.

6. The work vehicle periphery monitoring system according to claim 1, wherein when the object detecting device detects a new object, the display control device displays a mark representing the new object in the first image and the alarm notifying device notifies at least the first alarm.

7. The work vehicle periphery monitoring system according to claim 1, wherein before the alarm releasing instruction device receives an input for releasing the alarm, the display control device displays, as the second image on the display device, an image corresponding to a position in which the alarm releasing device first releases the alarm among images captured by the image capturing devices.

8. The work vehicle periphery monitoring system according to claim 7, wherein after the alarm releasing instruction device receives an input for releasing the alarm and then the alarm releasing device releases the alarm, the display control device displays, as the second image on the display device, an image corresponding to a position in which the alarm is released at a next time.

9. The work vehicle periphery monitoring system according to claim 1, wherein the alarm releasing device changes the releasing order in accordance with a state of the work vehicle.

10. The work vehicle periphery monitoring system according to claim 1, wherein the display control device displays, on the same screen of the display device, a third image representing at least one of a position as a subject of the alarm and a position in which the second image is displayed on the display device.

11. The work vehicle periphery monitoring system according to claim 10, wherein the display control device stops the display of the first image on the display device and displays only the third image and the second image displaying the mark on the same screen of the display device.

12. The work vehicle periphery monitoring system according to claim 1,
wherein when the work vehicle runs backward, the display control device displays, as a second image with the first image on the display device, an image at a rear side of the work vehicle among images captured by the image capturing devices, and
wherein when the work vehicle runs forward, the display control device displays, as the second image on the display device, an image of a position in which a dead angle from a driver seat of the work vehicle is the largest at a front side of the work vehicle among images captured by the image capturing devices.

13. The work vehicle periphery monitoring system according to claim 1, wherein when at least one of the object is detected, the first alarm and the second alarm are released at a same time based on the alarm releasing signal.

14. A work vehicle periphery monitoring system comprising:
a plurality of image capturing devices each of which is attached to a work vehicle and captures a periphery of the work vehicle to output an image information item;
a plurality of object detecting devices each of which is attached to the work vehicle to detect an object existing around the work vehicle;
a bird's eye image synthesizing device that acquires the plurality of image information items and synthesizes the acquired image information items to generate a bird's eye image information item for displaying a bird's eye image of the work vehicle and the periphery of the work vehicle on a display device;
a display control device that displays a first image in which a mark representing the object detected by the object detecting device overlaps the bird's eye image based on the bird's eye image information item on a screen of the display device;
an alarm notifying device that notifies an alarm by displaying a region with the mark in a manner different from a region without the mark in the first image and notifying an existence of the object by a sound;
an alarm releasing instruction unit that receives an input for releasing the alarm; and
an alarm releasing device that releases the alarm in accordance with a releasing order which is prioritized and predetermined regarding relations between a plurality of regions around the work vehicle and a plurality of running modes of the work vehicle based on an alarm releasing signal from the alarm releasing instruction device, the running modes of the work vehicle including a forward, a neutral, a stop, and a reverse,
wherein the display control device displays, on the same screen of the display device, a third image representing at least one of a position as a subject of the alarm and a position in which the second image is displayed on the display device, and even after the alarm releasing device releases the alarm, the display control device keeps displaying the mark; and
wherein in a case in which: a highest priority is put on a first alarm region; alarm sound in the first alarm region is set as high level; the alarm sound in the first alarm region is notified as the second alarm; and an operator operates the alarm releasing device, the second alarm is released, the first alarm may be also released along with a release of the second alarm, and the second alarm corresponding to an existence of the mark in the first alarm region is first released.

15. A work vehicle comprising:
the work vehicle periphery monitoring system comprising:
a plurality of image capturing devices each of which is attached to a work vehicle and captures a periphery of the work vehicle to output an image information item;
a plurality of object detecting devices each of which is attached to the work vehicle to detect an object existing around the work vehicle;
a bird's eye image synthesizing device that acquires the plurality of image information items and synthesizes the acquired image information items to generate a bird's eye image information item for displaying a bird's eye image of the work vehicle and the periphery of the work vehicle on a display device;
a display control device that displays a first image in which a mark representing the object detected by the object detecting device overlaps the bird's eye image based on the bird's eye image information item on a screen of the display device;
an alarm notifying device that notifies an alarm by displaying a region with the mark in a manner different from a region without the mark in the first image and notifying an existence of the object by a sound;
an alarm releasing instruction unit that receives an input for releasing the alarm; and
an alarm releasing device that releases the alarm in accordance with a releasing order which is prioritized and predetermined regarding relations between a plurality of regions around the work vehicle and a plurality of running modes of the work vehicle based on an alarm releasing signal from the alarm releasing instruction device, the running modes of the work vehicle including a forward, a neutral, a stop, and a reverse, wherein the display control device displays, on the same screen of the display device, a third image representing at least one of a position as a subject of the alarm and a position in which the second image is displayed on the display device, and even after the alarm releasing device releases the alarm, the display control device keeps displaying the mark; and wherein in a case in which: a highest priority is put on a first alarm region; alarm sound in the first alarm region is set as high level; the alarm sound in the first alarm region is notified as the second alarm; and an operator operates the alarm releasing device, the second alarm is released, the first alarm may be also released along with a release of the second alarm, and the second alarm corresponding to an existence of the mark in the first alarm region is first released.

16. A work vehicle comprising:
the work vehicle periphery monitoring system comprising:
a plurality of image capturing devices each of which is attached to a work vehicle and captures a periphery of the work vehicle to output an image information item;
a plurality of object detecting devices each of which is attached to the work vehicle to detect an object existing around the work vehicle;
a bird's eye image synthesizing device that acquires the plurality of image information items and synthesizes the acquired image information items to generate a bird's eye image information item for displaying a bird's eye image of the work vehicle and the periphery of the work vehicle on a display device;
a display control device that displays a first image in which a mark representing the object detected by the object detecting device overlaps the bird's eye image based on the bird's eye image information item on a screen of the display device;
an alarm notifying device that notifies, as an alarm, at least one or both of a first alarm of displaying a region with the mark in a manner different from a region without the mark in the first image and a second alarm of notifying an existence of the object by a sound;
an alarm releasing instruction device that receives an input for releasing the alarm; and
an alarm releasing device that releases the alarm in accordance with a releasing order which is prioritized and predetermined regarding relations between a plurality of regions around the work vehicle and a plurality of running modes of the work vehicle based on an alarm releasing signal from the alarm releasing instruction device,
wherein in a case in which: a highest priority is put on a first alarm region; alarm sound in the first alarm region is set as high level; the alarm sound in the first alarm region is notified as the second alarm; and an operator operates the alarm releasing device, the second alarm is released, the first alarm may be also released along with a release of the second alarm, and the second alarm corresponding to an existence of the mark in the first alarm region is first released.

* * * * *